US012536258B2

(12) United States Patent
Zamora Martínez et al.

(10) Patent No.: US 12,536,258 B2
(45) Date of Patent: Jan. 27, 2026

(54) AUTHENTICATING AN IDENTITY OF A PERSON

(71) Applicant: VERIDAS DIGITAL AUTHENTICATION SOLUTIONS, S.L., Tajonar (ES)

(72) Inventors: Francisco Julián Zamora Martínez, Tajonar (ES); Jose Luis González de Suso Molinero, Tajonar (ES); Jan Koloda, Tajonar (ES); Miguel Ángel Sánchez Yoldi, Tajonar (ES); Eduardo Azanza Ladrón, Tajonar (ES)

(73) Assignee: VERIDAS DIGITAL AUTHENTICATION SOLUTIONS, S.L., Tajonar (ES)

( * ) Notice: Subject to any disclaimer, the term of this patent is extended or adjusted under 35 U.S.C. 154(b) by 812 days.

(21) Appl. No.: 17/112,373

(22) Filed: Dec. 4, 2020

(65) Prior Publication Data
US 2021/0117529 A1     Apr. 22, 2021

Related U.S. Application Data

(63) Continuation of application No. PCT/EP2018/070513, filed on Jul. 27, 2018.

(30) Foreign Application Priority Data

Jun. 13, 2018    (EP) .................... 18382416

(51) Int. Cl.
*G06F 21/32*     (2013.01)
*G06N 3/045*    (2023.01)
(Continued)

(52) U.S. Cl.
CPC ............ *G06F 21/32* (2013.01); *G06N 3/045* (2023.01); *G06N 3/08* (2013.01); *G06V 20/40* (2022.01);
(Continued)

(58) Field of Classification Search
CPC .......... G06F 21/32; G06N 3/08; G06V 20/40; G06V 40/15
See application file for complete search history.

(56) References Cited

U.S. PATENT DOCUMENTS 6,282,362 B1 * 8/2001 Murphy ............... H04N 5/9201
358/909.1
2014/0153721 A1 * 6/2014 Malone ................. H04L 9/3271
380/259

(Continued)

FOREIGN PATENT DOCUMENTS

EP     3156978 A1    4/2017
WO   2016037077 A1    3/2016

OTHER PUBLICATIONS

International Search Report and Written Opinion received in international application No. PCT/EP2018/070513, dated Jan. 25, 2019 (14 pages).

(Continued)

*Primary Examiner* — Matthew T Henning
(74) *Attorney, Agent, or Firm* — Edell, Shapiro & Finnan, LLC

(57) ABSTRACT

Methods for authenticating an identity of a person. One such method includes: obtaining, from a capturing device, one or more captures including image and/or audio captures; detecting, based on spoofing-detection criteria, spoofing indicators in the captures and whether the spoofing indicators correspond to spoofing indicia; detecting, based on liveness-detection criteria, biometric-features in the captures and whether the biometric-features correspond to liveness indicia; detecting, based on identity-biometric criteria, biometric attributes in the captures and whether the biometric attributes correspond to a predefined human identity; extracting, based on time-related criteria, a time-reference hidden or codified in the captures and detecting whether the (Continued)

time-reference satisfies predefined time constraints; and authenticating the identity of the person depending on whether spoofing indicia have been detected, whether liveness indicia have been detected, whether biometric attributes have been detected corresponding to predefined human identity, and whether the time-reference satisfies predefined time constraints.

18 Claims, 2 Drawing Sheets

(51) Int. Cl.
*G06N 3/08* (2023.01)
*G06V 20/40* (2022.01)
*G06V 40/10* (2022.01)
*G06V 40/40* (2022.01)
*G06V 40/50* (2022.01)
*G06V 40/70* (2022.01)

(52) U.S. Cl.
CPC .............. *G06V 40/15* (2022.01); *G06V 40/45* (2022.01); *G06V 40/50* (2022.01); *G06V 40/70* (2022.01)

(56) References Cited

U.S. PATENT DOCUMENTS

| | | | |
|---|---|---|---|
| 2015/0033305 A1* | 1/2015 | Shear | G06F 21/53 726/11 |
| 2015/0347734 A1* | 12/2015 | Beigi | H04L 9/3268 726/28 |
| 2018/0046871 A1 | 2/2018 | Ionita | |
| 2018/0060648 A1 | 3/2018 | Yoo | |
| 2018/0082304 A1* | 3/2018 | Summerlin | G06Q 20/3229 |
| 2018/0316904 A1* | 11/2018 | Uchidate | H04N 13/183 |

OTHER PUBLICATIONS

Rakshit et al., "Face Spoofing and Counter-Spoofing: A Survey of State-of-the-art Algorithms," Society for Science and Education United Kingdom, vol. 5, No. 2, May 2, 2017 (43 pages).

* cited by examiner

AUTHENTICATING AN IDENTITY OF A PERSON

CROSS-REFERENCE TO RELATED APPLICATIONS

This application relates to and claims the benefit and priority to International Appl. No. PCT/EP2018/070513, filed Jul. 27, 2018, which claims the benefit and priority to European Patent Application EP18382416.8, filed Jun. 13, 2018.

The present disclosure relates to methods of authenticating an identity of a person, and to computer programs, systems and computing systems suitable for performing such authentication methods. The present disclosure further relates to portable devices that include such authentication (computing) systems.

BACKGROUND

Nowadays, digital information is becoming a key aspect in society, since it is reaching every aspect of routine at work, at leisure time, at the administration and at practically every task performed daily or very regularly. This fact has been particularly important due to the development of internet-enabled portable devices and increasing developing of related technologies. The increasing computing power of said portable devices has provoked their use in the same or similar manner as conventional desktop and laptop computers.

Under this context, using the mobile phone to perform sensitive operations in terms of e.g. securely accessing sensible information, the operation itself and its confidentiality has also become a very relevant concern among users. For that reason, developers are facing new challenges in terms of conceiving new ways and technologies aimed at providing access to sensitive information as secure as possible. In general, information handling and processing under maximally secure conditions is emerging as a very sensitive matter in all or most computing related applications.

Different "security" schemas and approaches are currently known in multiple commercial sectors such as: banking, retail, compliance, etc. which are normally developed as a verification process and/or as an identification process. Verification processes may be based on a comparison of the user performing a given request against previously recorded credentials of that user (one-to-one comparison approach). Identification processes may be based on a comparison of the user performing the request against information retrieved from all of registered users (one-to-many comparison approach).

An object of the present disclosure is to provide new methods, computer programs, systems and computing systems for authenticating an identity of a person to improve security in digital operations in comparison with prior art implementations.

SUMMARY

In an aspect, a method of authenticating an identity of a person is provided. The method comprises obtaining or capturing from (a combination of one or more capturing sensors and) one or more capturing devices, one or more captures including one or more image captures and maybe one or more audio captures. Such an image capture (or captures) may be either a captured still image (photo) or captured moving images (video), etc., which may be taken spanning a large variety of electromagnetic spectrum, including the visible light. These obtaining or capturing elements/aspects may be generally referred herein to as obtaining or capturing functionality.

The method further comprises detecting, based on predefined spoofing-detection criteria, one or more spoofing indicators (or distortions) in the one or more captures and whether said one or more spoofing indicators correspond or not to spoofing indicia. Spoofing detection refers to a forgery detection analysis whose aim is to determine whether the capture(s) correspond(s) to an authentic (i.e. not synthetically fabricated) scene, sequence of scenes, video, audio, etc. Spoofing detection does not depend on biometric, identity, time-related features or parameters. These spoofing detection elements/aspects may be generally referred herein to as spoofing detection functionality.

The method further comprises detecting, based on predefined liveness-detection criteria, one or more biometric features in the one or more captures and whether said one or more biometric features correspond or not to liveness indicia. Liveness detection refers to a forgery detection analysis in which biometric features are evaluated to determine whether the person recorded in the capture(s) shows signs (or proof) of life. These liveness-related elements/aspects may be generally referred herein to as liveness detection functionality.

The method still further comprises detecting, based on predefined identity-biometric criteria, one or more biometric attributes in the one or more captures and whether said one or more biometric attributes correspond or not to a predefined human identity (that e.g. may be stored in corresponding repository of predefined identities). These identification elements/aspects may be generally referred herein to as identity detection functionality.

The method yet further comprises extracting, based on predefined time-related criteria, a time-reference hidden or codified (or coded) in the one or more captures and detecting whether said time-reference corresponds or not to a predefined expected time (or time constraints). This detection may be performed by e.g. comparing different time-references extracted from the one or more captures (between themselves) and checking that resulting time differences are not greater than a predefined time such as e.g. thirty seconds. These time-related elements/aspects may be generally referred herein to as time verification functionality.

The method furthermore comprises authenticating the identity of the person depending on whether spoofing indicators (or distortions) have been detected corresponding to spoofing indicia, whether biometric features have been detected corresponding to liveness indicia, whether biometric attributes have been detected corresponding to predefined human identity, and whether the time-reference corresponds to predefined expected time (or time constraints). These authentication elements/aspects may be generally referred herein to as authenticating functionality.

A powerful and reliable authentication method is thus provided herein, which comprises a complete sequence of verifications including spoofing, liveness, identity, and time validations. Each of said validations may provide data representing a magnitude of presence/absence of spoofing, liveness, identity, and time correlation in corresponding "biometric" image/audio captures. If presence of significant spoofing indicia and/or insignificant liveness, identity and/or time indicia is detected, the authentication may result failed and, otherwise, the authentication may result successful.

Failure of the authentication may be promoted if spoofing indicators or distortions have been detected which correspond to spoofing indicia exceeding a predefined spoofing threshold and, otherwise, success of the authentication may be promoted. Success of the authentication may be promoted if biometric features have been detected which correspond to liveness indicia exceeding a predefined liveness threshold and, otherwise, failure of the authentication may be promoted. Success of the authentication may be promoted if biometric attributes have been detected which correspond to predefined human identity and, otherwise, failure of the authentication may be promoted. Success of the authentication may be promoted if the extracted time-reference corresponds to (or satisfies) predefined expected time constraints and, otherwise, failure of the authentication may be promoted.

Additionally or alternatively, combinations of at least some of the spoofing, liveness, identity and time-related indicia (or indicators, parameters, etc.) may be determined to promote success of the authentication if the combination satisfies predefined authentication constraints (or predefined indicia indicators) and, otherwise, to promote failure of the authentication. The combination of spoofing, liveness, identity and time-related indicia may be determined by attributing a weight to each of the combined indicia. Said determination of the combination may further comprise (or not) imposing restrictions on all or part (or a combination) of the combined indicia, indicators, parameters, etc. For example, the promotion of the success or failure of the authentication may be proportional to the weights attributed to the indicia in the combination (with or without imposed restrictions). Further details about how combinations of spoofing, liveness, identity and time-related indicia (or indicators, parameters, etc.) may be determined are provided in other parts of the disclosure.

Failed authentication may provoke e.g. denial of requested privilege/authorization(s). Successful authentication may provoke e.g. acceptance of requested privilege/authorization(s).

Spoofing validation is performed based on predefined spoofing-detection criteria. Liveness verification is performed based on predefined liveness-detection criteria. Identity validation is performed based on predefined identity-biometric criteria. Time verification is performed according to predefined time-related criteria. Any of these predefined criteria may be implemented through an "intelligent" module trained under e.g. machine learning principles. These machine learning techniques may include e.g. one or more classifiers, convolutional neural networks, distilled model techniques, Siamese models with an additional classification layer, generative adversarial networks (GANs), variational auto-encoders (VAEs), etc. Details about how the predefined spoofing-detection, liveness-detection, identity-biometric and time-related criteria may be implemented are provided in other parts of the disclosure.

The proposed authentication method(s) may be implemented to be executable using a capturing device, such as e.g. a smartphone, laptop, tablet, etc. In this case, the corresponding user may simply use the capturing device to capture e.g. a selfie photo and/or selfie video, and eventually also selfie audio and/or any other type of selfie recording for (biometric) authentication. A selfie photo or selfie video recording or capturing, regardless of the type of recording, may comprise capturing a specific type of information (face picture, video recording, etc.) corresponding to the user/person to be authenticated. The capture may be triggered by a deliberate action performed by the user/person (e.g. framing the face within the camera capturing area, making a gesture, pushing buttons, saying something, etc.). These captures may then be processed by the "authentication" method to discern whether the user is really the person who he/she claims to be. At least some of the verifications performed by the method may comprise emitting (random) instructions (at e.g. random timing) to the user and verifying whether said instructions have been executed and captured. The random instructions and time instants may be sampled from a predefined probability distribution, or following a particular mathematical function. For example, the user may be requested to wink an eye and corresponding video capture may be analyzed to verify whether said eye wink has been performed at e.g. a particular instant, as part of e.g. liveness verification(s).

The capturing device (e.g. smartphone, cloud server, laptop, etc.) may comprise e.g. an executable version of a computer program implementing the whole authentication method or only a part thereof. For instance, some of the verifications may be performed at the capturing device and other(s) may be performed at a computer that may be at a remote location. This remote computer may be e.g. a cloud server or any other type of remote server. The capturing device and the remote computer may be connected through any type of communications network such as e.g. the Internet and, in particular, Mobile Internet. Capturing devices with very powerful computing resources may perform the whole authentication method. Portable devices with more limited computing resources may perform a part of the authentication method. In this last scenario, the method may further comprise corresponding sending(s) of capture(s) to the remote computer and corresponding reception(s) of results from the remote computer.

According to the above considerations, the suggested authentication methods may be executed in a very versatile and flexible way by merely operating a capturing device normally carried by most of the population. For instance, very light and popular capturing (portable) devices (e.g. smartphones) may be used to perform very powerful and reliable authentications to e.g. gain some kind of "digital" authorization or privilege.

In a further aspect, a computer program is provided comprising program instructions for causing a computing system to perform any of the previous methods of authenticating an identity of a person. This computer program may be embodied on a storage medium and/or carried on a carrier signal. Since this computer program is suitable for performing the above authentication methods, same or similar principles and advantages as those commented with respect to the methods may be attributed to these computer programs.

In a still further aspect, a computing system is provided for authenticating an identity of a person, the computing system comprising a memory and a processor, embodying instructions stored in the memory and executable by the processor, the instructions comprising functionality to execute any of the previous methods of authenticating an identity of a user (or person). Since this computing system is suitable for performing the above authentication methods, same or similar principles and advantages as those commented with respect to the methods may be attributed to these computing systems.

In a yet further aspect, a system is provided for authenticating an identity of a person. This system comprises a capturing module, a spoofing-detection module, a liveness-detection module, an identity-biometric module, a time-checking module, and an authentication module.

The capturing module is configured to obtain (or capture), from one or more (or a combination of) capturing devices (or sensors), one or more captures including one or more image and/or audio captures. In other words, this capturing module is configured to perform the capturing or obtaining functionality described with respect to the above authentication method.

The spoofing-detection module is configured to detect, based on predefined spoofing-detection criteria, one or more spoofing indicators (or distortions) in the one or more captures and whether said one or more spoofing indicators correspond or not to spoofing indicia. In other words, this spoofing-detection module is configured to perform the spoofing detection functionality described with respect to the above authentication method.

The liveness-detection module is configured to detect, based on predefined liveness-detection criteria, one or more biometric features in the one or more captures and whether said one or more biometric features correspond or not to liveness indicia. In other words, this liveness-detection module is configured to perform the liveness detection functionality described with respect to the above authentication method.

The identity-biometric module is configured to detect, based on predefined identity-biometric criteria, one or more biometric attributes in the one or more captures and whether said one or more biometric attributes correspond or not to a predefined human identity. In other words, this identity-biometric module is configured to perform the identity detection functionality described with respect to the above authentication method.

The time-checking module is configured to extract, based on predefined time-related criteria, a time-reference hidden or codified (or coded) in the one or more captures and detecting whether said time-reference corresponds or not to a predefined expected time. In other words, this time-checking module is configured to perform the time verification functionality described with respect to the above authentication method.

The authentication module is configured to (successfully) authenticate the identity of the person depending on whether spoofing indicators (or distortions) corresponding to spoofing indicia have not been detected, whether biometric features have been detected corresponding to liveness indicia, whether biometric attributes have been detected corresponding to predefined human identity, and whether the time-reference corresponds to predefined expected time. In other words, this authentication module is configured to perform the authenticating functionality described with respect to the above authentication method.

Since this "authentication" system is suitable for performing the above authentication methods, same or similar principles and advantages as those commented with respect to said methods may be attributed to such "authentication" systems.

In a furthermore aspect, a portable (and/or capturing) device (and/or module) may be provided comprising any of the above computing systems and/or any of the above systems for authenticating an identity of a user or person.

These and other advantages and features will become apparent in view of the detailed description and drawings provided herein.

BRIEF DESCRIPTION OF THE DRAWINGS

Non-limiting examples of the present disclosure will be described in the following, with reference to the appended drawings, in which.

DETAILED DESCRIPTION

For reasons of completeness, references to prior art disclosures are included in the following descriptions so as to provide the skilled person with detailed information for implementing any of the examples described herein. These prior art disclosures are listed at the end of this section of detailed descriptions, each of said disclosures being labelled with an identifier [name, year] wherein name indicates a main, representative author of the disclosure and year indicates the year of the disclosure. Such prior art disclosures are referred to in the following detailed descriptions through said labels/identifiers.

In general, authentication processes according to the present disclosure may be aimed at verifying the identity of a person/user by making use of e.g. one or more (image, video) selfie recordings and/or one or more captures of ID document(s) belonging to the person/user (to be authenticated). The recordings and/or captures may then be verified by the system to be authentic so that biometric access cannot be achieved by providing forged data.

Figure 1:
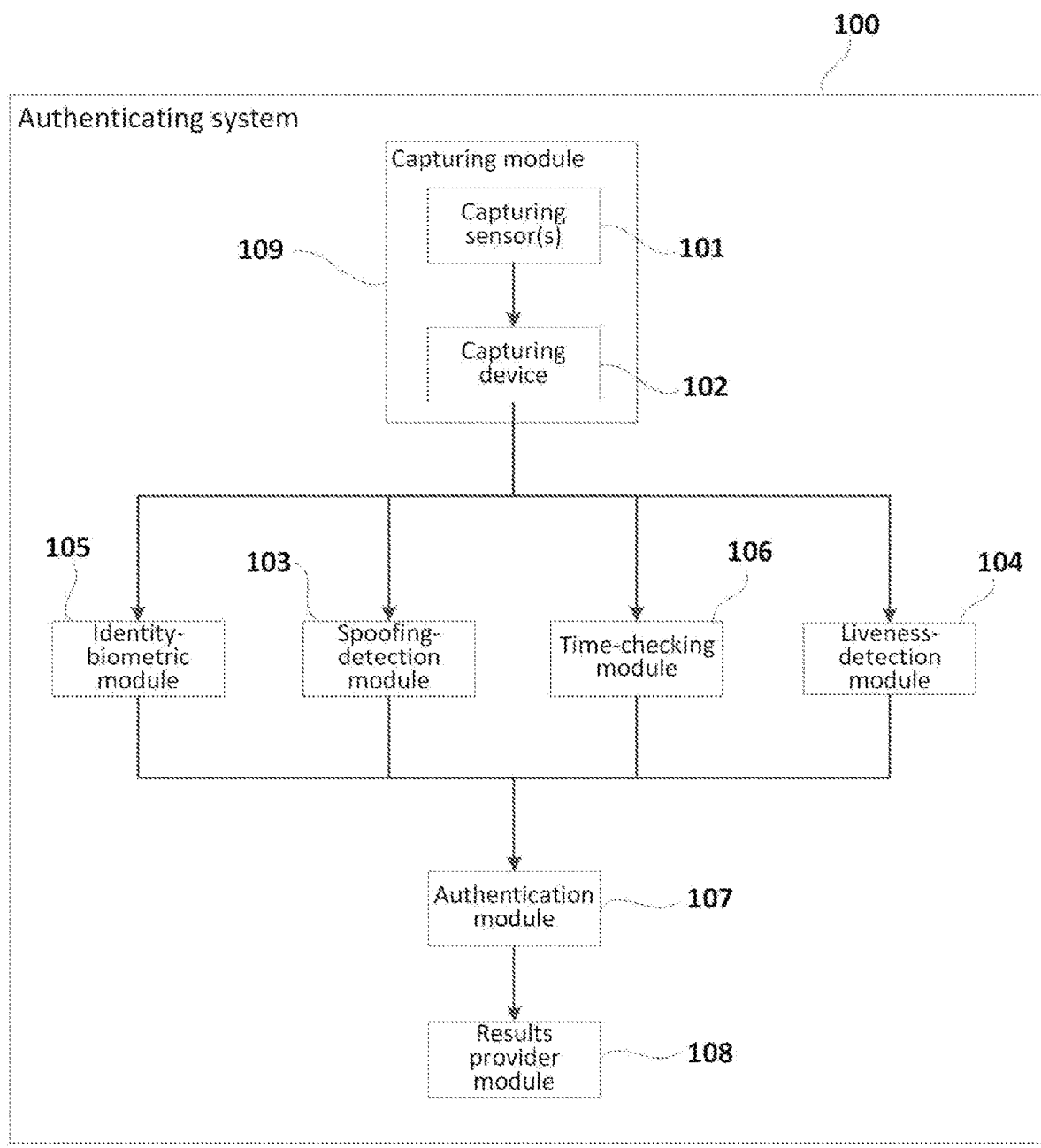
FIG. 1 is a block diagram schematically representing a system for authenticating an identity of a user/person according to examples.

FIG. 1 is a block diagram schematically representing a (computing) system 100 for authenticating an identity of a person/user according to examples. The authentication system 100 may be e.g. comprised in a capturing module (included in e.g. a portable device) having computing capabilities, memory capabilities to store corresponding software and data. In this sense, the authentication system 100 may be included in e.g. a smartphone, a laptop, a tablet, smartglasses, a smartwatch, a mini-computer, a robot, a printed circuit board (PCB) with suitable processor, memory, etc. and configuration, or any other hardware/software implementation suitable to perform authentication methods according to the present disclosure.

As shown in the figure, an authentication system 100 according to the present disclosure may comprise various modules, such as e.g. a capturing module 109, a spoofing-detection module 103, a liveness-detection module 104, an identity-biometric module 105, a time-checking module 106, and an authentication module 107. The capturing module 109 may comprise e.g. a capturing sensor 101 and/or a capturing device 102 that may cooperate to obtain corresponding image capture(s), audio capture(s), etc. to be processed. The authentication system 100 may further comprise other modules such as e.g. a results provider module 108, and others not shown in the figure.

As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the described particular module. Moreover, the modules may be implemented across multiple devices (associated or linked to the authentication system 100) and/or other components that may be local or remote to one another. Additionally, the modules may be moved from one device and added to another device, and/or may be included in both devices (associated to the authentication system 100). Any software implementations may be tangibly embodied in one or more storage media, such as e.g. a memory device, a floppy disk, a compact disk (CD), a digital versatile disk (DVD), or other devices that may store computer code.

The capturing sensor 101 may be internal or external to the capturing device 102, and may be configured to capture light, Sound Pressure Level (SPL), etc. To this end, the capturing sensor 101 may be any suitable capturing sensor such as e.g., Charge-Coupled Device(s) (CCDs), microphone(s), etc.

The capturing device 102 may be internal or external to the authentication system 100 (in FIG. 1 it is shown as internal), and may be implemented (or configured) to capture images, videos, audios . . . in e.g. digital format. To this end, the capturing device 102 may be any suitable capturing device such as e.g. photo camera(s), video camera(s), audio microphone(s), etc.

The capturing module 109 may be configured to obtain, from e.g. the combination of the capturing sensor 101 and the capturing device 102, one or more captures including image, video, audio capture(s) and to provide said capture(s) to any one of the spoofing-detection module 103, liveness-detection module 104, identity-biometric module 105 and time-checking module 106.

The spoofing-detection module 103 may be configured to detect one or more spoofing indicators (or distortions) in the image, video, audio . . . capture(s) and whether said indicator(s) or distortion(s) may correspond to spoofing indicia. This detection of spoofing indicators and spoofing indicia may be based on predefined spoofing-detection criteria defining a correspondence or correlation between predefined image/audio patterns/models and corresponding predefined spoofing indicators (or parameters).

An inputted image/audio capture best matching one or more of the predefined image/audio patterns may cause the predefined spoofing-detection criteria to output corresponding predefined spoofing indicators (or parameters). Such best matching may be determined in terms of e.g. a difference or deviation between the inputted image/audio capture(s) and corresponding predefined image/audio pattern(s) that is below a predefined difference threshold.

If some best (or sufficient) matching is found, the inputted image/audio capture may thus be determined as including spoofing indicia. In this case, outputted spoofing indicators may include e.g. a spoofing level parameter denoting the gravity of the corresponding spoofing indicators. If no best (sufficient) matching is found, the inputted image/audio capture may be determined as not including spoofing indicia. In this scenario, the outputted spoofing indicators may include e.g. the spoofing level parameter denoting nonexistence of spoofing indicia.

The predefined spoofing-detection criteria may be implemented based on modelling and describing multimedia distortion artefacts and/or on machine learning techniques to e.g. automatically train the spoofing-detection module 103 depending on a diversity of image/audio pattern samples and expected results attributable to said samples. These machine learning techniques may include e.g. one or more of classifiers, convolutional neural networks, distilled model techniques, Siamese models with additional classification layer, variational auto-encoders, generative adversarial networks, etc. An ensemble of previously defined models is possible in order to e.g. reduce the variance of the authentication system, by taking profit of the diversity of the combination.

The spoofing-detection module 103 may be continuously and/or regularly trained based on selected machine learning approach or approaches during all or part of its life cycle, such that an increasing accuracy may be achieved. The spoofing-detection module 103 may be configured or trained to e.g. produce "doubtful" results when an inputted image/audio does not sufficiently fit any of the expected/predefined scenarios or patterns. These "doubtful" results and corresponding inputted image/audio may be subsequently analyzed and supervised by competent (human) staff for augmenting the spoofing-detection dataset that may be (or to be) used for training, testing, etc. and continuously improving the spoofing-detection module 103.

The predefined spoofing-detection criteria may be implemented (through e.g. machine learning) to cause image processing of a personal photo included in the one or more captures (from the capturing module 109) so as to detect spoofing indicators (or distortions) corresponding to spoofing indicia that are used to assess the presence of spoofing. Instructions may have been provided to corresponding user to prompt him/her to take the personal photo from e.g. an identification document (ID doc photo) and/or in a selfie way (selfie photo) and/or capturing the photo(s) with a device/camera not belonging to the user/person (to be authenticated).

Such an image processing of the personal photo may include performing approximations based on texture descriptors and, in particular, Local Binary Patterns (LBP), which may take advantage of the fact that real faces usually contain different texture patterns compared to fake faces (see e.g. [Phan, 2016]). The detection of such texture patterns may include global and/or local computations of various LBPs that gather joint color-texture information from the face images (see e.g. [Boulkenafet, 2018]). Texture descriptors may then be built by concatenating the resulting LBPs or by an aggregation of resulting LBPs (e.g., LBP histograms).

Additionally or alternatively, the image processing of the personal photo may include detecting and analyzing (textural) noise in the personal photo, produced by e.g. a recapturing process, and detecting distortions corresponding to spoofing indicia based on resulting (textural) noise data. A recapturing process may refer to e.g. capturing an already captured scene (or scenes in photo or video format), regardless of the physical support of the original capture (printed photo, screen content, etc.). Said noise may comprise (or not comprise) print-derived noise such as halftoning and/or digital noise such as dithering. These distortions may involve techniques of separation of natural acquisition noise from textural noise (see e.g. [Nguyen, 2016]), the latter being a (probably strong) spoofing indicator that may be taken into account to derive spoofing indicia.

The image processing of the personal photo may (further or alternatively) include detecting the presence of periodic visual artefacts caused by a recapture of screen content. Such visual artefacts, corresponding to spoofing indicia, may be detected by analyzing the cyclo-stationarity or features based on cyclo-stationarity of the image signal corresponding to the personal photo (see e.g. [Mandian, 2015]) through e.g. the cyclic-autocorrelation function and/or spectral correlation function.

Additionally or alternatively, the image processing of the personal photo may include applying printer identification techniques to the personal photo, and detecting spoofing indicators (or distortions) corresponding to spoofing indicia based on resulting printer identification data. These distortions, caused by the recapture of a printed and therefore not genuine content, may include (or not include) detecting the presence of printing patterns, such as e.g. dithering or halftoning. This detection may be carried out by analyzing the power spectrum of the image signal corresponding to the personal photo (see e.g. [Kim, 2014]) and/or by pattern model construction (see e.g. [Wu, 2015]).

Additionally or alternatively, the image processing of the personal photo may include detecting and analyzing image re-compression(s) in the personal photo, and detecting distortions corresponding to spoofing indicia based on resulting re-compression data. These distortions, caused by forbidden tampering of digital content, may involve abnormal compression artefacts (see e.g. [Chen, 2011]), identification of transform coding chains (see e.g. [Tagliasacchi, 2016]), detection of JPEG ghosts (see e.g. [Zach, 2012]), etc.

The image processing of the personal photo may (further or alternatively) include detecting and analyzing optical distortions (due to e.g. digital manipulation in the personal photo) and detecting distortions corresponding to spoofing indicia based on optical distortions detected by said analysis. These distortions may include identification of radial distortion chains (see e.g. [Scarzanella, 2013]) caused by e.g. the fact that the image signal (forming the photo) has passed through at least two optical systems. Optical distortions due to digital manipulation may be similarly detected (and analyzed) in a personal video included in the one or more captures (from the capturing module 109).

Additionally or alternatively to the previous implementations of the predefined spoofing-detection criteria, said criteria may be implemented using a classifier trained with features derived from light reflection due to an artificial light source (e.g. flashlight or similar), so as to detect whether light reflection on e.g. an ID doc photo corresponds to original or forged (or false) ID doc. The ID doc photo may refer to the area of an ID doc (Identification Document) that contains the printed face of the ID doc holder/owner. Light reflection features may be defined so they may account for different behaviors of the light reflected from genuine ID doc surface and from forged/false ID doc surface. The behavior of the reflected light is conditioned by the physical and/or chemical properties of the material the ID doc is made of and the light sensible protecting elements the ID doc contains such as e.g. optical variable ink(s), kinegram(s), etc. These light reflection features may include one or more of size, area, dispersion degree, texture, etc. A classifier trained with texture features may be (further or alternatively) used to detect whether textures in the ID doc photo correspond to original or forged/false ID doc. Said texture features may be extracted using (at least some of) the texture descriptors indicated in other parts of the present disclosure. Said detection of textures may include either consideration or non-consideration of light reflection due to an artificial light source.

Additionally or alternatively to the previous implementations, the predefined spoofing-detection criteria may be implemented by performing image processing of two ID doc photos included in the one or more captures (from the capturing module 109). In this case, the image processing of the two ID doc photos may include analyzing the amount of detected light in one of the two ID doc photos as having been taken without an artificial light source and in the other of the two ID doc photos as having been taken with an artificial light source. The amount of detected light in the one and the other of the ID doc photos may be compared to each other, so as to detect non-laminated printings. The light reflection properties of genuine ID doc photos in the presence and absence of an artificial light source differ from those of false ID doc photos. This detected difference (i.e. spoofing indicator) may be subsequently analyzed in order to assess whether it corresponds to spoofing indicia.

Additionally or alternatively to the previous implementations, the predefined spoofing-detection criteria may be implemented by performing image processing of two personal photos included in the one or more captures (from the capturing module 109). An objective of this may be to detect spoofing attempts that rely on using two captures, different or not, of the same face-containing scene. In other words, the aim is to detect spoofing attempts that use photo duplication to gain fraudulent access to the biometric (authentication) system. In order to detect such photo duplication, the aforementioned image processing may include estimating an affine transformation between facial key (or feature) points in the two personal photos and measuring an error, which may be normalized by the dimensions of the two personal photos. The two photos may be aligned and compared to each other by employing the aforementioned estimated affine transformation. Such an image processing may (further or alternatively) include measuring a Euclidean distance between the two personal photos, which may be performed in a feature domain. This Euclidean distance may be one of the spoofing indicators that may denote spoofing indicia. Additionally or alternatively, the image processing may include face shadows comparison by analyzing partial contrasts in each of the two personal photos with respect to an average grey level of the personal photo(s) and measuring a similarity between said contrasts of the two personal photos. This contrast similarity may be one of the spoofing indicators that may denote spoofing indicia. Additionally or alternatively, the image processing may include measuring in each of the two personal photos partial contrasts of a lower half face with respect to an average grey level of an upper half face, to detect changes in facial hair and/or mouth and/or lips. Absence of such contrast changes may be one of the spoofing indicators that may denote spoofing indicia due to photo duplication. The image processing may (further or alternatively) include measuring a difference of the eyes and/or mouth and/or whole face areas between the two personal photos. Absence of such differences may be another one of the spoofing indicators that may denote spoofing indicia due to photo duplication. Additionally or alternatively, the image processing may include e.g. measuring consistency between lip distances in the two personal photos.

The image processing for spoofing detection may also include processing a personal video (or sequence or array or set of images or frames). The personal video may correspond to e.g. a video capture of an identification document (ID doc video) and/or in a selfie way (selfie video), etc. The image processing of the personal video may include detecting optical distortions produced by a recapturing process (e.g. photo capture of a displayed photo, video capture of a displayed video, etc.). The image processing of the personal video may include applying previously described techniques for spoofing detection in personal photo(s), but in this case to determine authenticity of the personal video taking into account that it contains several photos or frames. All or part of said photos or frames in the personal video may be analyzed through said techniques. For instance, print-derived noises (such as e.g. halftoning and/or dithering) may be analyzed (and detected) in all or part of the frames in the personal video. Optical distortions caused by e.g. digital manipulation of the personal video may also be detected in a similar manner as described with respect to spoofing detection from personal photo(s). Another applicable technique may be based on estimating scene deepness to form (or construct) tri-dimensional (3D) images(s) from bi-dimensional (2D) images/frames included in the personal video to e.g. establish differences between a legit video and a forged video showing a photo of the user (regardless of its physical support).

Additionally or alternatively to the previous implementations, the predefined spoofing-detection criteria may comprise detecting thermal changes corresponding to a person represented in the personal video(s) in order to assess that said person has not been supplanted by artificial 2D (e.g. printed photo, screen, etc.) or 3D objects (e.g. facial masks, 3D-printed heads, etc.). The detection of thermal changes in the personal video(s) may be done by performing image processing of the personal video taking into account technical characteristics (e.g. dynamic range, sensitivity, etc.) and/or thermal images of a thermal camera that (presumably) has been used to capture the personal video(s). Additionally or alternatively, the detection of thermal changes in the personal video(s) may be performed taking into account that the thermal camera is comprised in a capturing device (or module) performing the authentication method, or in another (remote) device in communication with the capturing device (or module). Further computing systems may intermediate between the capturing module 109 and the other (remote) device. Such thermal changes may be spoofing indicators (or distortions) that may correspond to spoofing indicia.

The liveness-detection module 104 may be configured to detect one or more biometric features in the received capture(s) and whether said biometric feature(s) correspond to liveness indicia. Such detection of biometric feature(s) and liveness indicia may be based on predefined liveness-detection criteria, which may be implemented in a similar way as described with respect to the predefined spoofing-detection criteria of the spoofing-detection module 103.

Similar principles as those described with respect to the predefined spoofing-detection criteria may be used to implement the predefined liveness-detection criteria but, in this case, defining a correspondence or correlation between predefined image/audio patterns/models and predefined biometric and liveness parameters. Machine learning may also be used to train the liveness-detection module 104 based on input image/audio pattern samples and expected output biometric/liveness parameters which, in turn, may include e.g. a liveness indicator denoting sufficient or insufficient liveness indicia, etc.

The predefined liveness-detection criteria may be implemented (through e.g. machine learning) to cause image processing of one or more personal videos (or sequence or array or set of images or frames) included in the one or more captures (from the capturing module 109) so as to detect biometric features corresponding to liveness indicia. Instructions may have been provided to corresponding user/person to prompt him/her to take the personal video(s) e.g. from an identification document (ID doc video) and/or in a selfie way (selfie video), and/or capturing the video(s) with a device/camera not belonging to the user/person (to be authenticated).

Such an image processing of the personal video (for liveness verification) may include detecting spatial changes, and/or movements, and/or light and/or color changes perceptible or not at plain view in the one or more personal videos. Such detections may be performed by analyzing user reactions (movements, and/or gestures, and/or other user actions) to different type of stimuli that have been produced by the (one or more) capturing device(s) during capture of the personal video(s). User reactions can be categorized as voluntary, involuntary, absence of reaction, etc. Involuntary reactions may be physical reactions and/or physiological reactions. Regarding the aforementioned system stimuli, they may be lighting (e.g. based on light and/or color), acoustic, mechanical, thermal, requested user actions (e.g. asking the user to wink), and/or absence of stimuli. Additionally or alternatively, any of previous stimuli may be planned over time to follow a previously prepared deterministic schedule, a stochastic probability distribution of stimuli, or any predetermined mathematical model. The image processing of the personal video may comprise analyzing one or more user reactions to one or more produced system stimuli, which could be distributed over time as indicated by any possible time scheduled plan. Thermal changes in personal video(s) may also be taken into account for liveness verification in same or similar manner as previously described with respect to spoofing verification from personal photo(s). In some examples, thermal changes in personal video(s) may be detected to e.g. derive whether a mask or similar has been used to produce the personal video(s). Detection of lower and more constant thermic values under the analysis of thermal images or frames forming the personal video(s) may denote that a mask or similar article has been fraudulently used. Similar considerations to those indicated in relation to spoofing verification may be applied to images or frames forming the personal video(s) for liveness verification.

The aforementioned detection of spatial changes and/or movements in the personal video(s) may comprise detecting any spatial change related to corresponding human body represented in the personal video(s). Said spatial changes may correspond (or not correspond) to any user reaction involving movement of e.g. a human head of the human body. Said detection of spatial changes may include (or not include) detecting changes in e.g. eyes and/or eyebrows and/or nose and/or mouth and/or lips and/or cheeks and/or forehead and/or hair of the human head. Such changes may be detected by using image transformation techniques, which may be oriented to allow enhancing subtle movements in the video and extract conclusions from them. Such techniques may be based on e.g. wavelet transformations (see e.g. [Fahmy, 2017]) and/or local image descriptor computation (see e.g. [Davison, 2015]).

Additionally or alternatively, the aforementioned detection of spatial changes and/or movements in the personal video(s) may comprise detecting involuntary movements made by the user. This detection of involuntary movements may provide valid or reliable features for liveness detection as they are (normally) difficult to replicate. Specifically, involuntary movement detection may be performed by detecting micro-movements and/or color micro-changes in the personal video.

The aforementioned detection of any spatial change related to a human body, or part(s) of it, represented in the personal video(s) by using the aforementioned techniques may (further or alternatively) comprise detecting involuntary physical or physiological changes. Such a detection of changes may include (or not include) inferring (or detecting) a pulse of the human body by analyzing micro-movements of a head of the human body, and/or nostrils, and/or blood vessels of any part of the human body based on an analysis in time and/or frequency domains (see e.g. [Balakrishnan, 2013]). Additionally or alternatively, the detection of spatial change(s) by using the aforementioned techniques may be performed taking into account technical characteristics of optical lens that (presumably) has been used to enhance the resolution of the personal video(s), and may include or not include inferring (or detecting) hair growth on a human head of the human body. Additionally or alternatively, the detection of spatial change(s) by using the aforementioned techniques may comprise (or not comprise) specifically inferring (or detecting) pupil shape change(s) and/or blink(s) in eyes of the human body represented in the personal video(s).

Additionally or alternatively to the previous detection of physiological changes in corresponding person represented in the personal video(s), thermal changes may be detected similarly as described in spoofing detection techniques. Additionally or alternatively, the aforementioned detection of physiological changes in corresponding person represented in the personal video(s) may comprise detecting sweat in said person by e.g. using image processing techniques related with reflection changes evaluation.

The aforementioned detection of light and/or color changes in the personal video(s) may be performed taking into account that the personal video(s) have been recorded under certain deliberate lighting (system) stimuli and, therefore, may include lighted personal video(s) (under lighting stimuli) and unlighted personal video(s) (without lighting stimuli). The lighted personal video(s) may correspond to personal video(s) captured with (or influenced by) an artificial light source such as e.g. torchlight or similar, and the unlighted personal video(s) may correspond to personal video(s) captured without an artificial light source. These lighted and unlighted personal video(s) may include (or not include) face video(s). Such analysis may be performed to assess implicit (biometric) features related to liveness detection. For instance, light reflections produced by an artificial light source may be analyzed to detect presence of sweat and/or facial fat. The detection of light and/or color changes may be performed (further or alternatively) taking into account that the personal video(s) have been captured by a video capturing device that has performed a programmed action during corresponding video capture, so as to detect plain view changes caused by said programmed action in corresponding person represented in the personal video(s). Such changes may be analyzed by measuring changes in the luminance and/or color components of the image and/or the relation between the actual light and/or color modification in the personal video and/or the expected light and/or color modification. Additionally or alternatively, the detection of light and/or color changes may be performed taking into account that the personal video(s) includes capture of a requested human action performed by corresponding person during corresponding video capture of the personal video(s), so as to detect e.g. plain view changes caused by said requested human action, such as e.g. a measure to counter personal video forgery. Under these assumptions, some other methods to additionally or alternatively counter forgery by making the user to perform certain controlled actions at a determined time will be described hereinafter.

Additionally or alternatively, the aforementioned detection of light and/or color changes may be performed taking into account that a varying artificial light source (in terms of e.g. illumination or color changes as lighting stimuli) has been used in corresponding capture of the personal video(s). In particular, a varying color that has been produced randomly (on e.g. a screen of pertinent capturing device) during capture(s) may be (or not be) taken into account. The detection of light and/or color changes may include (or not include) detecting reflections of said varying color(s) on corresponding human face represented in the lighted face video(s). The detection of light and/or color changes may be performed taking into account (or not taking into account) that the lighted personal video(s) have been captured with a varying artificial light source in terms of e.g. illumination level. These different illumination levels may have been (or not have been) randomly varied or following (or not following) a time variant function, within same or different video capture(s). Additionally or alternatively, the detection of light and/or color changes may be performed taking into account (or not taking into account) that the lighted and unlighted personal video(s) have been captured with different exposure times, which may include (or not include) different exposure times randomly varied. Additionally or alternatively, the detection of light and/or color changes may comprise detecting light changes in an eye's pupil represented in the lighted and unlighted face video(s). This may be performed taking into account (or not taking into account) light intensity changes (presumably) due to light reflections in the pupil and/or pupil shape changes between the lighted face video(s) and the unlighted face video(s). Additionally or alternatively, the detection of light and/or color changes may comprise detecting light changes in a nose represented in the lighted and unlighted face video(s) taking into account that a nose (normally) corresponds to most prominent face part causing more intense light reflections. Such detections may be done using the aforementioned image processing techniques for light and/or color variation detection. Such detections may be used to allow evaluating forgery in the personal video, as the recording conditions caused by the aforementioned capture conditions are bound to provide a sense of uniqueness to the personal video(s), since it may be considered they can hardly be reproduced.

Additionally or alternatively, the aforementioned detection of light and/or color changes may comprise detecting human motion reactions represented in the lighted personal video(s), and determining a correspondence between said human motions and light variations (presumably) due to the varying artificial light source (e.g. torchlight, flashlight or similar). The detection of human motions represented in the lighted personal video(s) may comprise determining action times corresponding to when said human motions have been detected within lighted personal video(s). The determination of correspondence between the human motions and light variations may comprise comparing the determined action times with variation times corresponding to when light variations have (presumably) occurred during video capture. The determination of the correspondence between human motions and light variations may comprise determining whether a difference between action times and light variation times is within predefined acceptability range. These correspondences may aid to establish the uniqueness of the video capture, thus providing tools for counter personal video forgery.

Additionally or alternatively, the aforementioned detection of light and/or color changes may comprise detecting whether the human motion reactions detected in the lighted personal video(s) correspond to distinguishing human motions with respect to the unlighted personal video(s). The aforementioned detection of light and/or color changes may comprise detecting human motions in a single video stream (comprised in the one or more captures), the stream being either lighted or unlighted.

The aforementioned detection of light and/or color changes taking into account programmed actions and/or system stimuli during corresponding video capture may be performed taking into account (or not taking into account) that all or some of the programmed actions have been performed randomly over time. Additionally or alternatively, the detection of light and/or color changes (including human motions) may be performed taking into account (or not taking into account) that all or some of the programmed actions comprise an acoustic stimulus at any frequency of a human audible spectrum, so as to detect corresponding human motion in the personal video(s) as a reaction to said acoustic stimulus. This detection may be based on how humans react to certain sound stimuli, such as (but not uniquely) high frequencies, which tend to be rejected. Under such circumstances, an emotion analysis from the human motion (see e.g. [Bernhardt, 2010]) could be performed to assess the reaction. The detection of light and/or color changes may be performed (further or alternatively) taking into account (or not taking into account) that all or some of the programmed actions comprise a visual stimulus on a screen, which may be (or not be) a visual stimulus based on Augmented Reality, so as to detect corresponding human motion in the personal video(s) as a reaction to said visual stimulus. Additionally or alternatively, the detection of light and/or color changes may be performed taking into account that all or some of the programmed actions comprise a mechanical stimulus, which may be (or not be) a vibrating stimulus and/or a thermal variation stimulus, so as to detect corresponding human motion in the personal video(s) as a reaction to said mechanical stimulus. Additionally or alternatively, the detection of light and/or color changes may be performed taking into account that all or some of the programmed actions comprise an olfactory stimulus, so as to detect corresponding human motion in the personal video(s) as a reaction to said olfactory stimulus.

The aforementioned detection of light and/or color changes taking into account a requested human action during corresponding video capture may comprise detecting, in the personal video(s), an executed human action not defined in the requested human action. Such an executed human action could be done as a collateral consequence of performing the requested action. For instance, the requested human action may include e.g. pointing to an environment element and/or touching a screen and/or providing a fingerprint, etc. while the executed human action may include a different action such as e.g. a predefined head movement and/or a predefined eye movement, etc. Additionally or alternatively, the detection of light and/or color changes may comprise detecting, in the personal video(s), an executed human action indicating features of a visual stimulus included in the requested human action, performed as a consequence of those visual stimuli; e.g. human motion indicating a sad reaction to a sad visual stimulus. An audio component (or signal) of the personal video(s) may be (or not be) used to detect the executed human action therefrom. Said detection of the executed human action may also be performed depending (or not depending) on a manual feature selection on a screen from a visual component of the personal video(s). Additionally or alternatively, the detection of light and/or color changes may comprise detecting, in the personal video(s), lip movements and spoken words from said lip movements due to a speech indicated in the requested human action. The detection of the spoken words may comprise (or not comprise) performing speech recognition (techniques) from an audio component (or signal) of the personal video(s). The detection of lip movements and spoken words may comprise (or not comprise) detecting a correspondence between the spoken words inferred from the lip movements and the spoken words derived from the audio component/signal of the personal video(s).

Additionally or alternatively to the above implementations, the predefined liveness-detection criteria may be implemented (through e.g. machine learning approaches) to cause audio processing of one or more personal audios included in the one or more captures (from the capturing module 109) so as to detect biometric features corresponding to liveness indicia. Instructions may have been provided to corresponding user to prompt him/her to record such personal audios(s).

The identity-biometric module 105 may be configured to detect one or more biometric attributes in the received capture(s) and whether said biometric attribute(s) correspond to a same (predefined) human identity. Predefined identity-biometric criteria may be used to perform such a detection of biometric attribute(s) and correspondence to same (predefined) human identity. The predefined identity-biometric criteria may be implemented in a similar way as described with respect to the predefined spoofing-detection criteria of the spoofing-detection module 103.

Similar principles as those described with respect to the predefined spoofing-detection criteria may be used to implement the predefined identity-biometric criteria but, in this case, defining a correspondence or correlation between predefined image/audio patterns/models and predefined biometric attributes and correspondence to predefined human identity. For instance, machine learning may be used to train the identity-biometric module 105 based on input image/audio pattern samples and expected output biometric attributes and correspondence to predefined human identity. The trained identity-biometric module 105 may further produce e.g. an identity indicator denoting sufficient or insufficient correspondence to predefined human identity.

The predefined identity-biometric criteria may be implemented (through e.g. machine learning) to cause image processing of one or more personal photos included in the one or more captures (from the capturing module 109) so as to detect biometric attributes corresponding to predefined human identity. Instructions may have been provided to corresponding user to prompt him/her to take said personal photo(s) from e.g. an identification document (ID doc photo) and/or in a selfie way (selfie photo) and/or capturing the photo(s) with a device/camera not belonging to the user/person (to be authenticated).

Such an image processing for identity verification may include extracting information of illumination and/or exposure conditions from a first of the personal photo(s) as having been taken with an artificial light source (e.g. flashlight, torchlight, etc.) and from a second of the personal photo(s) as having been taken without an artificial light source. Biometric features and corresponding predefined human identity may then be determined depending on said extracted illumination conditions, by e.g. applying the aforementioned biometric authentication techniques over the personal photos that have been taken on different illumination and/or exposure conditions. Said evaluation using the first and second personal photos may comprise extracting biometric features from the first personal photo as being a selfie photo taken with an artificial light source and from the second personal photo as being a selfie photo taken without an artificial light source.

Additionally or alternatively, the image processing for identity verification may comprise using convolutional neural networks with a cost function based on separability of photo-samples belonging to different classes (wherein different classes may correspond to different identities) and clustering of photo-samples belonging to same class, so as to detect the biometric features and corresponding predefined human identity depending on said separability and clustered classes.

The aforementioned use of convolutional neural networks may include applying regularization technique(s) according to at least one of the following approaches. A first approach may comprise applying any regularization technique(s) based on (applying) minimal separation margins between photo-samples belonging to different classes or identities, wherein all the photo-samples may be in the same training batch of corresponding neural network optimization algorithm (see e.g. [Qi and Su, 2017]). This first approach may be used e.g. when all clusters are close to each other (which usually happens during first iterations of the optimization procedure). A second approach may include applying any regularization technique(s) based on penalizing photo-samples located near cluster centers of identities not belonging to the identity of the photo-samples. This second approach may be helpful on later optimization steps, by e.g. adding higher penalization to more confusing (or divergent) samples. A third approach may comprise applying any regularization technique based on penalizing a distance between identity cluster centers. All mentioned penalizations may be (or not be) based on any L-norm distance (e.g. L2) and/or a cosine distance, etc. This third approach may be helpful at later optimization steps by comparing cluster centers between them, instead of comparing a sample and a list of clusters.

Additionally or alternatively, the image processing for identity verification may comprise determining system responses (more) suitable for human interpretation, which may be (or not be) computed on top of biometric features and predefined human identities. An example of responses (more) suitable for human interpretation may include e.g. a confidence value representing a percentage of similarity between two people as interpreted by a human.

The aforementioned determination of the system responses (more) suitable for human interpretation may include determining the (authentication) system responses in terms of an empirical likelihood that (two) different biometric features belong to same person/user (to be authenticated). This likelihood may be estimated on a representative development dataset, and the response may be computed (or determined) by comparing a distance of the biometric features with the performance of similar distances on the representative development dataset. Additionally or alternatively, the system responses (more) suitable for human interpretation may be determined in terms of a posteriori empirical distribution (or probability) that a distance between (different) biometric features indicates or denotes that said biometric features belong to the same person. The determination of system responses (more) suitable for human interpretation in terms of empirical likelihood and/or in terms of posteriori distribution may be based on extracting information from a Receiver Operating Characteristic curve on a representative development dataset.

The determination of system responses (more) suitable for human interpretation in terms of posteriori distribution may be based on fitting any parametric distribution(s) corresponding to positive biometric verification(s) and any parametric distribution(s) corresponding to negative biometric verification(s). The parametric distribution(s) corresponding to positive and negative biometric verification(s) may be normal distribution(s).

The time-checking module 106 may be configured to extract a time-reference hidden or codified (or coded) in the one or more captures and to detect whether said time-reference(s) correspond to a predefined expected time or time constraints. Predefined time-related criteria may be used to perform such extraction and detection of time-related characteristic(s).

Similar principles as those described with respect to the predefined spoofing-detection criteria may be used to implement the predefined time-related criteria but, in this case, defining a correspondence or correlation between predefined image/audio patterns/models and predefined time extraction rules and corresponding time-related verification. For example, machine learning may be used to train the time-checking module 106 based on input image/audio pattern samples and expected time extraction and verification. The trained time-checking module 106 may further produce e.g. a time indicator denoting sufficient or insufficient correspondence to predefined expected time or time constraints. Such a time indicator may express e.g. whether the extracted time is within a predefined time interval around a given time such as e.g. current time.

The predefined time-related criteria may be implemented (through e.g. machine learning) to cause image processing of time-referenced capture(s) included in the one or more captures (from the capturing module 109) so as to extract therefrom corresponding hidden or coded time-reference for its comparison with the predefined expected time. Instructions may have been provided to corresponding user to prompt him/her to perform said time-referenced capture(s).

Such a time-related image processing may comprise extracting at least one of the following time data forming the time-reference: time indicating when corresponding time-referenced capture has been obtained, time elapsed from when corresponding capturing device has been switched on, time elapsed from when an app has been downloaded, time elapsed between any other processes performed by corresponding capturing device. The extraction of the time elapsed between any other processes performed by the capturing device may comprise e.g. extracting a time elapsed between two different captures performed by the capturing device/module 109.

Such an extracted time data may be verified to confirm (or not) whether said time data satisfies certain predefined time-constraint(s). Such time-constraint(s) may comprise e.g. rule(s) to check whether a time difference between (two) extracted times is below a predefined time-difference threshold, rule(s) to verify whether said elapsed times (or time differences) satisfy or are within predefined elapsed time values (or thresholds, or ranges, etc.), rule(s) to verify whether extracted time data follow a predefined sequential pattern/model, etc.

Additionally or alternatively, the time-related image processing may comprise extracting further data linked to the time-reference for further validations. This further data may include at least one of the following data: user-related data, device-related data, capturing conditions data. The user-related data may comprise at least one of the following data: geographic location, user skills that may include (or not include) an indicator of whether the user is left and/or right handed. The device-related data may comprise at least one of the following data: device model, device identifier, device language, operating system, device software and hardware versions, versions of the tools/programs/parts forming/installed in the device, other features of the device. The capturing conditions data may comprise at least one of the following data: orientation, height, brightness, volume, pressure on the screen, temperature.

Additionally or alternatively, the time-related image processing may comprise extracting any of the time-reference and/or the aforementioned data linked to the time-reference based on steganographic techniques including at least one of the following approaches: Least Significant Bit (LSB) techniques which e.g. may introduce a controlled modification in the LSB of several pixels in the image that may be (or not be) selected based on at least one of a sequential, a pseudo-random, and a selection function-based approach (see e.g. [Kavitha, 2012]); color palette-based techniques (see e.g. [Bandyopadhyay, 2010]); quantized coefficient-based techniques, which may include (or not include) steganography in JPEG (see e.g. [Cheng, 2002]); matrix embedding (see e.g. [Fridrich, 2006]), coding matrix (see e.g. [Kim, 2007]) and/or wet paper code-based techniques (see e.g. [Fridrich, 2005]); adaptive steganography techniques, which may include (or not include) Highly Undetectable SteGO (HUGO) techniques (see e.g. [Sanguinetti, 2015]) and/or Wavelet Obtained Weights (WOW) techniques (see e.g. [Liao, 2015]); phase coding hiding techniques; echo hiding techniques (see e.g. [Jayaram, 2011]).

Additionally or alternatively, the time-related image processing may comprise extracting any of the time-reference and/or data linked (or associated) to the time-reference depending on a user of the capturing device. Said extraction may be performed depending (or not depending) on user credentials such as e.g. a user ID of said user. The user may correspond to the person whose identity is to be authenticated by methods, systems according to present disclosure. Additionally or alternatively, the time-related image processing may comprise extracting any of the time-reference and/or data linked (or associated) to the time-reference that is fully or partially signed electronically with corresponding private key(s), and validating corresponding signatures based on corresponding public key(s). Optionally, such public key(s) may be (or not be) obtained from the capturing module (or device) 109 itself which is performing the authentication method. Additionally or alternatively, the time-related image processing may comprise extracting any of the time-reference and/or data linked (or associated) to the time-reference that is fully or partially securely encrypted (in e.g. the capturing module 109), and decrypting said encrypted data with corresponding private key(s). Optionally, such public key(s) may be (or not be) obtained from a server dedicated to that aim.

The authentication module 107 may be configured to determine the authentication as successful or failed depending on whether spoofing indicators (or distortions) corresponding to spoofing indicia have or have not been detected. Success of the authentication may be promoted or demoted depending on whether biometric features corresponding to liveness indicia have or have not been detected. Success of the authentication may be promoted or demoted depending on whether biometric attributes corresponding to predefined human identity have or have not been detected. Success of the authentication may be promoted or demoted depending on whether the extracted time-reference corresponds or does not correspond to predefined expected time. Additionally or alternatively, such promotion/demotion of success of the authentication may be parameterized by a combination of described (spoofing, liveness, identity, time) indicators, which may be affected by a set of constraints applied to all or part or a combination of the described indicators.

Success of the authentication may be promoted (or demoted) depending on a combination of at least some of the received spoofing, identity, liveness and time-related indicators/indicia in which the relevance of each indicator may be differently weighted. Spoofing indicators may be e.g. more relevant to the authentication verdict (or result) than liveness indicators. Spoofing and/or liveness indicators may be e.g. more relevant than time-related indicators. These weights may be variable such that they may be changed according to the application of the authentication, the evolving requirements of said application, etc. This combination may cause a promotion of the success or failure of the authentication that may be proportional to corresponding weighted spoofing, identity, liveness and time-related indicators or indicia (produced by modules 103-106). For example, if spoofing indicator denotes 80% of spoofing probabilities, success of the authentication may be penalized proportionally to said probabilities. Conversely, if spoofing indicator denotes 20% of spoofing probabilities, success of the authentication may be promoted proportionally to these probabilities. Same or similar rules/criteria may apply to the other indicators/indicia.

The authentication method may be performed depending on a combination of at least some of the spoofing, identity, liveness and time-related indicia (or indicators or parameters . . . ), optionally affected by restrictions imposed on each of the indicators and/or any combination thereof. For example, if the spoofing indicator denotes a spoofing probability greater than 80%, the authentication may be determined as failed, independently of the confidence in any other indicia. Additionally or alternatively, the combination of (at least some of the) spoofing, liveness, identity and time-related indicia may be determined by performing a convex combination. Additionally or alternatively, at least some of the spoofing, liveness, identity and time-related indicia may be combined through a convex combination, the imposed restrictions may be combined through a multiplicative combination and, finally, a product of both convex and multiplicative combinations may be determined.

The authentication process may be performed by e.g. one or more trained machine learning models whose parameters may be the aforementioned weights and/or the imposed restrictions. These parameters and machine learning models may be trained so as to produce promotion of the success or failure of the authentication according to said training.

These machine learning model parameters may be trained with a set of data generated by differentiating between legit and fraudulent data (i.e. captures), by e.g. imposing an objective of optimizing one or more precision metrics subject to one or more risks associated to one or more (or a combination) of corresponding spoofing, liveness, identity and time-related indicators (or indicia).

These machine learning model parameters may be trained with a set of data tagged by one or more humans using confidence information provided by corresponding spoofing, liveness, identity and time-related modules 103-106. This may be performed by e.g. imposing an objective of optimizing one or more precision metrics subject to one or more risks associated to one or more (or a combination) of the different spoofing, liveness, identity and time-related indicators (or indicia).

The results provider module 108 may be configured to display authentication results (e.g. successful or failed authentication) from authentication module 107, on corresponding display, screen, light indicator(s), etc.

Authentication (computing) systems according to the invention may be implemented by computing means, electronic means or a combination thereof. The computing means may be a set of instructions (that is, a computer program) and then the authentication (computing) system may comprise a memory and a processor, embodying said set of instructions stored in the memory and executable by the processor. The instructions may comprise functionality to execute authentication methods according to the present disclosure.

In case the authentication (computing) system is implemented only by electronic means, the controller may be, for example, a CPLD (Complex Programmable Logic Device), an FPGA (Field Programmable Gate Array) or an ASIC (Application-Specific Integrated Circuit).

In case the authentication (computing) system is a combination of electronic and computing means, the computing means may be a set of instructions (e.g. a computer program) and the electronic means may be any electronic circuit capable of implementing the corresponding method steps of the proposed authentication methods.

The computer program may be embodied on a storage medium (for example, a CD-ROM, a DVD, a USB drive, a computer memory or a read-only memory) or carried on a carrier signal (for example, on an electrical or optical carrier signal).

The computer program may be in the form of source code, object code, a code intermediate source and object code such as in partially compiled form, or in any other form suitable for use in the implementation of authentication methods. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant methods.

Figure 2:
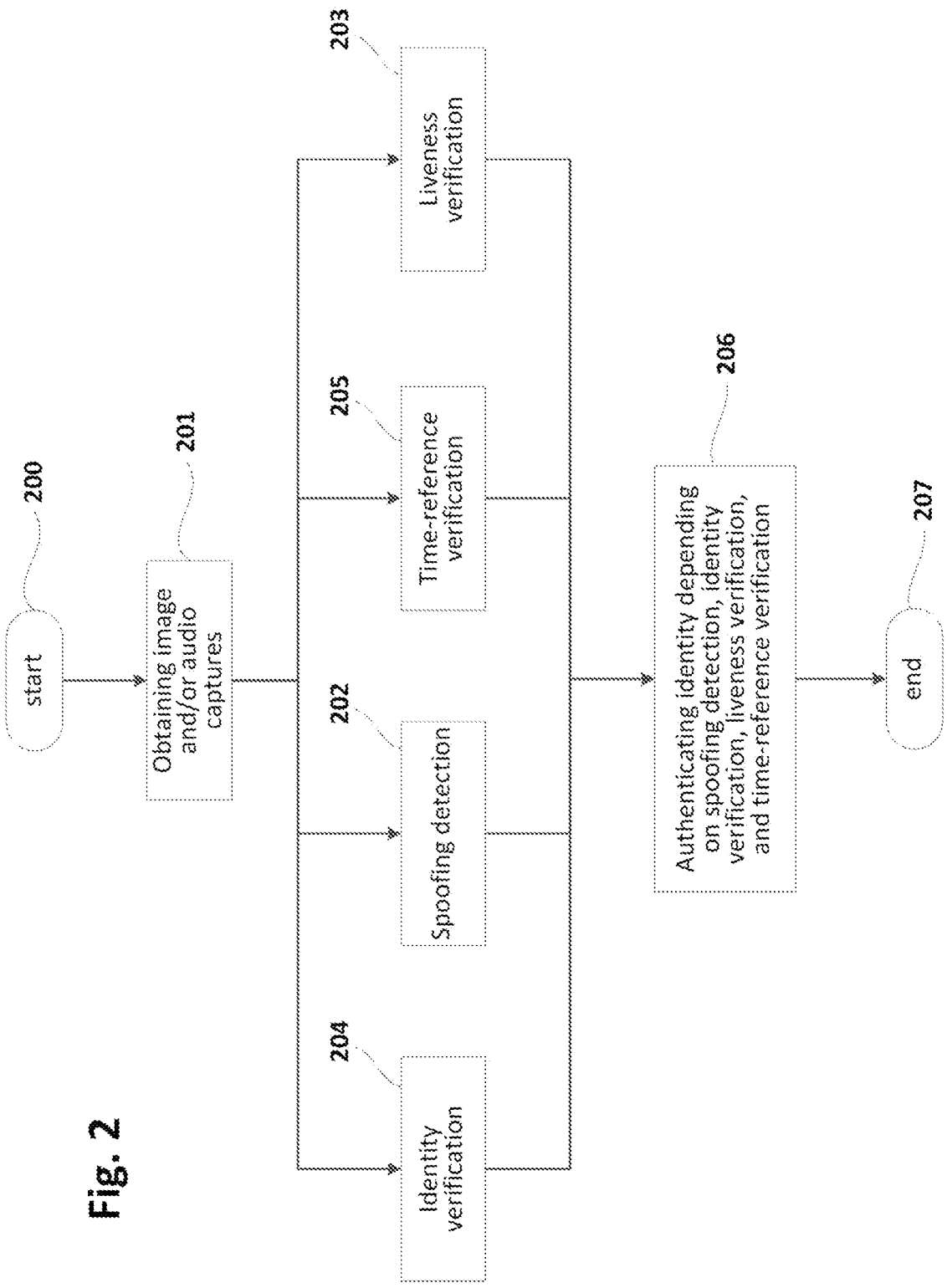
FIG. 2 is a flowchart schematically illustrating methods of authenticating an identity of a user/person according to examples.

FIG. 2 is a flowchart schematically illustrating authentication methods according to examples for authenticating an identity of a person. For the sake of better understanding, number references from FIG. 1 may be re-used in the following description of FIG. 2.

At initial block 200, the authentication method may be initiated as a result of (detecting) a starting condition such as e.g. activation of authentication functionality, attempt to access sensible information, attempt to run an app requiring user authentication, etc.

At block 201, one or more captures including one or more image and/or audio captures may be obtained from a capturing module 109, and may be provided to other modules aimed at processing said capture(s). In particular, the capture(s) may be provided to spoofing-detection module 103, liveness-detection module 104, identity-biometric module 105 and time-checking module 106. The obtaining of the capture(s) may be performed by the capturing module 109. Hence, same or similar principles previously described with respect to this capturing module 109 may be considered in relation to block 201.

At block 202, one or more spoofing indicators (or distortions) may be detected in the received capture(s) along with a correspondence of said distortion(s) to spoofing indicia. This detection of distortion(s) and spoofing indicia may be carried out by the spoofing-detection module 103. Same or similar fundamentals previously described with respect to this spoofing-detection module 103 may thus be considered with regard to block 202.

At block 203, one or more biometric features may be detected in the received capture(s) along with a correspondence of said biometric feature(s) to liveness indicia. This detection of biometric feature(s) and liveness indicia may be performed by the liveness-detection module 104. Same or similar rules previously described with respect to this liveness-detection module 104 may therefore be contemplated with reference to block 203.

At block 204, one or more biometric attributes may be detected in the received capture(s) along with a correspondence of said biometric attributes(s) to a predefined human identity. This detection of biometric attributes(s) and correspondence to predefined human identity may be executed by the identity-biometric module 105. Same or similar foundations previously described with respect to this identity-biometric module 105 may hence be considered in relation to block 204.

At block 205, a time-reference hidden or codified (or coded) in the capture(s) may be extracted therefrom, and a verification of whether said time-reference corresponds to a predefined expected time may be performed. These functions may be performed by the time-checking module 106. Accordingly, same or similar principles previously described in respect of this time-checking module 106 may be regarded in relation to block 205.

At block 206, spoofing, identity, liveness and time data/indicators may be received from previous blocks 202-205 and the identity of the person may be authenticated depending on such data/indicators. This functionality may be executed by the authentication module 107. Therefore, same or similar fundamentals previously described regarding this authentication module 107 may be taken into account in reference to block 206.

At block 207, the method may be terminated by e.g. providing authentication results, emitting warnings due to anomalous authentication, freeing volatile memory, switching the authentication functionality to standby state, etc. Such a provision of results may be performed by e.g. the results provider module 108.

In the different examples described herein, different predefined thresholds or patterns are used to identify special situations depending on e.g. a variable magnitude which is compared with corresponding threshold or pattern. Examples of such predefined thresholds/patterns are the predefined spoofing threshold, the predefined liveness threshold, the predefined difference threshold, the predefined time-difference threshold, the predefined elapsed time threshold, the predefined acceptability range, the predefined probability distribution, the predefined sequential pattern/model, etc. Said predefined thresholds/patterns may have been pre-established by performing experiments to determine e.g. from which value the variable magnitude may indicate the targeted special situation. These experiments may have been based on e.g. calculations of test (or sample) data and corresponding validation by a competent user to (continuously and/or regularly) refine the threshold. This refinement may be performed as many times as required along the life of corresponding method (and software/system) and depending on results provided by the method. Some of these thresholds/patterns may correspond to the same or similar concept but they have been differently denominated to differentiate them depending on corresponding functionality or context of application.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The following clauses disclose in a non-limiting manner additional embodiments.

Clause 1. A method of authenticating an identity of a person, the method comprising:
 obtaining, from one or more capturing devices, one or more captures including one or more image and/or audio captures;
 detecting, based on predefined spoofing-detection criteria, one or more spoofing indicators in the one or more captures and whether said one or more spoofing indicators correspond or not to spoofing indicia;
 detecting, based on predefined liveness-detection criteria, one or more biometric features in the one or more captures and whether said one or more biometric features correspond or not to liveness indicia;
 detecting, based on predefined identity-biometric criteria, one or more biometric attributes in the one or more captures and whether said one or more biometric attributes correspond or not to a predefined human identity;
 extracting, based on predefined time-related criteria, a time-reference hidden or codified in the one or more captures and detecting whether said time-reference corresponds or not to a predefined expected time or time constraints;
 authenticating the identity of the person depending on whether spoofing indicators corresponding to spoofing indicia have not been detected, whether biometric features have been detected corresponding to liveness indicia, whether biometric attributes have been detected corresponding to predefined human identity, and whether the time-reference corresponds to predefined expected time or time constraints.

Clause 2. A method according to clause 1, wherein authenticating the identity of the person includes promoting failure of the authentication if spoofing indicators or distortions have been detected which correspond to spoofing indicia exceeding a predefined spoofing threshold and, otherwise, promoting success of the authentication.

Clause 3. A method according to any of clauses 1 to 2, wherein authenticating the identity of the person includes promoting success of the authentication if biometric features have been detected which correspond to liveness indicia exceeding predefined liveness threshold and, otherwise, promoting failure of the authentication.

Clause 4. A method according to any of clauses 1 to 3, wherein authenticating the identity of the person includes promoting success of the authentication if biometric attributes have been detected which correspond to the predefined human identity and, otherwise, promoting failure of the authentication.

Clause 5. A method according to any of clauses 1 to 4 wherein authenticating the identity of the person includes promoting success of the authentication if the extracted time-reference satisfies predefined expected time constraints and, otherwise, promoting failure of the authentication.

Clause 6. A method according to any of clauses 1 to 5 wherein authenticating the identity of the person includes: determining a combination of at least some of the spoofing, liveness, identity and time-related indicia, promoting success of the authentication if said combination satisfies predefined authentication constraints and, otherwise, promoting failure of the authentication.

Clause 7. A method according to clause 6, wherein determining the combination of at least some of the spoofing, liveness, identity and time-related indicia comprises attributing a weight to each of the indicia in the combination, and preferably further comprises imposing restrictions on all or part or a combination of the indicia in the combination.

Clause 8. A method according to clauses 7, wherein authenticating the identity of the person comprises promoting success or failure of the authentication proportionally to the weights attributed to the indicia in the combination.

Clause 9. A method according to any of clauses 7 or 8 wherein determining the combination of at least some of the spoofing, liveness, identity and time-related indicia, either with or without imposed restrictions, includes determining a convex combination of corresponding indicia.

Clause 10. A method according to any of clauses 7 to 9, wherein determining the combination of at least some of the spoofing, liveness, identity and time-related indicia includes performing a convex combination of corresponding indicia, determining a multiplicative combination of the imposed restrictions, and determining a product of said convex combination and said multiplicative combination.

Clause 11. A method according to any of clauses 7 to 10, wherein the weights and restrictions of the combination of at least some of the spoofing, liveness, identity and time-related indicia are parameterized through machine learning techniques so as to produce promotion of the success or failure of the authentication.

Clause 12. A method according to any of clauses 1 to 11, wherein one or more of the predefined spoofing-detection criteria, the predefined liveness-detection criteria, the predefined identity-biometric criteria, and the predefined time-related criteria are configured or implemented using machine learning techniques.

Clause 13. A method according to any of clauses 11 or 12, wherein the machine learning techniques include one or more of classifiers, convolutional neural networks, distilled model techniques, Siamese models with additional classification layer, variational auto-encoders and generative adversarial networks.

Clause 14. A method according to any of clauses 1 to 13, wherein the one or more captures are presumed to include one or more personal photos of the person taken from an identification document (ID doc photo) and/or in a selfie way (selfie photo), and/or at least one personal video of the person taken from an identification document (ID doc video) and/or in a selfie way (selfie video).

Clause 15. A method according to clause 14, wherein the predefined spoofing-detection criteria are configured to detect spoofing indicators or distortions in a personal photo included in the one or more personal photos according to at least one of the following approaches:
 performing approximations based on Local Binary Patterns (LBP);
 detecting and analyzing a cyclo-stationarity or features based on cyclo-stationarity of the personal photo;
 applying printer identification techniques;
 detecting and analyzing image re-compressions;
 detecting and analyzing optical distortions due to digital manipulation;
 detecting and analyzing noise in the personal photo, preferably print-derived noise such as halftoning and/or digital noise such as dithering.

Clause 16. A method according to any of clauses 14 or 15, wherein the predefined spoofing-detection criteria are configured to detect distortions in an ID doc photo included in the one or more personal photos according to at least one of the following approaches: using a classifier trained with features derived from light reflection due to an artificial light source to detect whether light reflection on the ID doc photo corresponds to original or false ID doc, wherein features derived from light reflection include one or more of size, area, dispersion degree, texture;
- using a classifier trained with texture features to detect whether textures in the ID doc photo correspond to original or false ID doc, wherein said detection of textures includes either consideration or non-consideration of light reflection due to an artificial light source.

Clause 17. A method according to any of clauses 14 to 16, wherein the predefined spoofing-detection criteria are configured to detect spoofing indicators or distortions between two personal photos included in the one or more personal photos according to at least one of the following approaches:
- estimating an affine transformation between facial key points in the two personal photos and measuring an error normalized by the dimensions of the two personal photos;
- measuring a Euclidean distance between the two personal photos, in a feature domain;
- analyzing partial contrasts in each of the two personal photos with respect to an average grey level of the personal photo and measuring a similarity between said contrasts in the two personal photos;
- measuring in each of the two personal photos partial contrasts of a lower half face with respect to an average grey level of an upper half face, to detect changes in facial hair and/or mouth and/or lips;
- measuring a difference of the eyes and/or mouth and/or whole face areas between the two personal photos; and
- measuring consistency between lip distances in the two personal photos.

Clause 18. A method according to any of clauses 14 to 17, wherein the predefined spoofing-detection criteria are configured to detect distortions between two ID doc photos included in the one or more personal photos by:
- analyzing an amount of detected light in a first of the two ID doc photos as having been taken without an artificial light source and in a second of the two ID doc photos as having been taken with an artificial light source, and comparing the amount of detected light in the first and second of the two ID doc photos to detect non-laminated printings.

Clause 19. A method according to clause 14 to 18, wherein the predefined spoofing-detection criteria are configured to detect distortions in a personal video included in the at least one personal video according to at least one of the following approaches:
- detecting optical distortions produced by digital manipulation of the personal video;
- detecting and analyzing noise in the personal video, preferably print-derived noise such as halftoning and/or digital noise such as dithering;
- detecting thermal changes in the personal video;
- estimating scene deepness to form tri-dimensional (3D) image(s) from bi-dimensional (2D) images or frames included in the personal video.

Clause 20. A method according to clause 19, wherein the detection of thermal changes in the one or more personal videos is performed taking into account technical characteristics of a thermal camera that has been used to capture the one or more personal videos.

Clause 21. A method according to any of clauses 19 or 20, wherein the detection of thermal changes in the one or more personal videos is performed by a capturing device or module taking into account that the thermal camera is comprised in the capturing device/module or in another device in communication to the capturing device/module with or without a server intermediating between the capturing device/module and said other device.

Clause 22. A method according to any of clauses 14 to 21, wherein the predefined liveness-detection criteria are configured to detect biometric features and correspondent liveness indicia from one or more personal videos included in the at least one personal video according to at least one of the following approaches:
- detecting spatial changes and/or movements perceptible or not at plain view in the one or more personal videos;
- detecting physiological changes in a person represented in the one or more personal videos;
- detecting light changes and/or color changes in the one or more personal videos.

Clause 23. A method according to clause 22, wherein the detection of spatial changes and/or movements in the one or more personal videos comprises:
- detecting any spatial change related to a human body represented in the one or more personal videos, preferably related to a human head of the human body, and preferably related to eyes and/or eyebrows and/or nose and/or mouth and/or lips and/or cheeks and/or forehead and/or hair of the human head.

Clause 24. A method according to clause 23, wherein the detection of any spatial change related to a human body represented in the one or more personal videos is performed according to at least one of the following approaches:
- detecting micro-movements and/or color micro-changes in the personal video;
- detecting a pulse of the human body by analyzing micro-movements of a head of the human body, and/or nostrils, and/or blood vessels of any part of the human body based on an analysis in time and/or frequency domains;
- detecting hair growth on a human head of the human body, preferably taking into account technical characteristics of an optical lens that has been used to enhance resolution of the one or more personal videos;
- detecting pupil shape change(s) and/or blink(s) in eyes of the human body represented in the one or more personal videos.

Clause 25. A method according to any of clauses 22 to 24, wherein the detection of physiological changes in a person represented in the one or more personal videos comprises detecting sweat in said person.

Clause 26. A method according to any of clauses 22 to 25, wherein the detection of light and/or color changes in the one or more personal videos is performed according to at least one of the following approaches:
- taking into account that the one or more personal videos includes one or more lighted personal videos and one or more unlighted personal videos, the one or more lighted personal videos corresponding to personal videos captured with an artificial light source and the one or more unlighted personal videos corresponding to personal videos captured without artificial light source; wherein preferably the lighted and unlighted personal videos are face videos;

taking into account that the one or more personal videos have been captured by a video capturing device that has performed a programmed action during corresponding video capture, so as to detect plain view changes caused by said programmed action in corresponding person represented in the one or more personal videos;

taking into account that the one or more personal videos includes capture of a requested human action performed by corresponding person during corresponding video capture of the one or more personal videos, so as to detect plain view changes caused by said requested human action.

Clause 27. A method according to clause 26, wherein the detection of light and/or color changes taking into account the lighted and unlighted personal videos is performed according to at least one of the following approaches:

taking into account that the lighted personal videos have been captured with a varying artificial light source, more preferably by producing varying illumination or color in a screen of corresponding capturing device, and still more preferably by producing a randomly varying color in the screen, so as to detect reflections of said varying color on corresponding human face represented in the lighted face videos;

taking into account that the lighted personal videos have been captured with a varying artificial light source, more preferably with different illumination levels or similar, still more preferably with different illumination levels or similar randomly varied or following a time variant function, and yet more preferably with randomly varied illumination within same video capture;

taking into account that the lighted and unlighted personal videos have been captured with different exposure times, preferably with different exposure times randomly varied;

detecting light changes in an eye's pupil represented in the lighted and unlighted face videos, preferably taking into account light intensity changes due to light reflections in the pupil and/or pupil shape changes between the one or more lighted face videos and the one or more unlighted face videos;

detecting light changes in a nose represented in the lighted and unlighted face videos taking into account that a nose corresponds to most prominent face part causing more intense light reflections.

Clause 28. A method according to clause 27, wherein the detection of light and/or color changes comprises detecting human motions represented in the lighted personal videos, and determining a correspondence between said human motions and light variations in the varying artificial light source.

Clause 29. A method according to clause 28, wherein the detection of human motions represented in the lighted personal videos comprises determining action times corresponding to when said human motions have been detected within lighted personal videos; and wherein determining a correspondence between the human motions and the light variations comprises comparing the determined action times with light variation times corresponding to when light variations have occurred during corresponding video capture, and determining whether a difference between the action times and the light variation times is within predefined acceptability range.

Clause 30. A method according to any of clauses 28 or 29, wherein the detection of light and/or color changes comprises detecting whether the human motions detected in the lighted personal videos correspond to distinguishing human motions with respect to the unlighted personal videos.

Clause 31. A method according to any of clauses 26 to 30, wherein the detection of light and/or color changes taking into account programmed actions during corresponding video capture is performed according to at least one of the following approaches:

taking into account that all or some of the programmed actions have been performed randomly over time;

taking into account that all or some of the programmed actions comprise an acoustic stimulus at any frequency of a human audible spectrum, so as to detect corresponding human motion in the one or more personal videos as a reaction to said acoustic stimulus;

taking into account that all or some of the programmed actions comprise a visual stimulus on a screen, preferably a visual stimulus based on Augmented Reality, so as to detect corresponding human motion in the one or more personal videos as a reaction to said visual stimulus;

taking into account that all or some of the programmed actions comprise a mechanical stimulus, preferably a vibrating stimulus and/or a thermal variation stimulus, so as to detect corresponding human motion in the one or more personal videos as a reaction to said mechanical stimulus;

taking into account that all or some of the programmed actions comprise an olfactory stimulus, so as to detect corresponding human motion in the one or more personal videos as a reaction to said olfactory stimulus.

Clause 32. A method according to any of clauses 26 to 31, wherein the detection of light and/or color changes taking into account a requested human action during corresponding video capture is performed according to at least one of the following approaches:

detecting, in the one or more personal videos, an executed human action not defined in the requested human action, wherein preferably the requested human action includes pointing to an environment element, touching a screen, providing a fingerprint, etc. and/or the executed human action is detected via comparison with a predefined head movement, a predefined eye movement, etc.;

detecting, in the one or more personal videos, an executed human action indicating features of a visual stimulus included in the requested human action, wherein preferably said executed human action is detected from an audio component of the personal videos and/or by detecting a manual feature selection on a screen from a visual component of the personal videos;

detecting, in the one or more personal videos, lip movements and spoken words from said lip movements due to a speech indicated in the requested human action, preferably further detecting the spoken words through speech recognition from an audio component of the personal videos, and more preferably further detecting a correspondence between the spoken words from the lip movements and the spoken words from the audio component.

Clause 33. A method according to any of clauses 14 to 32, wherein the predefined identity-biometric criteria are configured to detect biometric features from the one or more personal photos and corresponding predefined human identity according to the following approach:

extracting illumination conditions from a first of the one or more personal photos as having been taken with an artificial light source and from a second of the one or more personal photos as having been taken without artificial light source, and detecting the biometric features and corresponding predefined human identity depending on said extracted illumination conditions.

Clause 34. A method according to clause 33, wherein extracting illumination conditions from the first and second of the one or more personal photos comprises extracting illumination conditions from the first of the one or more personal photos as being a selfie photo taken with artificial light source and from the second of the one or more personal photos as being a selfie photo taken without artificial light source.

Clause 35. A method according to any of clauses 14 to 34, wherein the predefined identity-biometric criteria are configured to detect biometric features from the one or more personal photos and corresponding predefined human identity according to at least one of the following approaches:
- using convolutional neural networks with cost function based on separability of photo-samples belonging to different classes and clustering of photo-samples belonging to same class, to detect the biometric features and corresponding predefined human identity depending on said separability and clustered classes;
- determining system responses suitable for human interpretation, preferably computed on top of biometric features and predefined human identities.

Clause 36. A method according to clause 35, wherein the use of convolutional neural networks includes applying one or more regularization techniques according to at least one of the following approaches:
- applying the one or more regularization techniques based on applying minimal separation margins between photo-samples belonging to different classes;
- applying the one or more regularization techniques based on applying penalizations to photo-samples belonging to a selected identity located near cluster centers of identities different from the selected identity, wherein preferably said penalizations are based on a L-norm distance and/or a cosine distance;
- applying the one or more regularization techniques based on penalizing a distance between identity cluster centers to classify photo-samples, wherein preferably said penalizations are based on a L-norm distance and/or a cosine distance.

Clause 37. A method according to any of clauses 35 or 36, wherein the determination of the system responses suitable for human interpretation is performed according to at least one of the following approaches:
- determining the system responses suitable for human interpretation in terms of an empirical likelihood that different biometric features belong to same person/user;
- determining the system responses suitable for human interpretation in terms of a posteriori empirical likelihood that a distance between different biometric features denotes that said biometric features belong to same person/user.

Clause 38. A method according to clause 37, wherein the system responses suitable for human interpretation in terms of empirical likelihood and/or the system responses suitable for human interpretation in terms of posteriori empirical likelihood is/are based on extracting information from a Receiver Operating Characteristic curve.

Clause 39. A method according to any of clauses 37 or 38, wherein system responses suitable for human interpretation measures in terms of posteriori empirical likelihood are based on fitting parametric distribution(s) corresponding to positive biometric verification(s) and parametric distribution(s) corresponding to negative biometric verification(s).

Clause 40. A method according to clause 39, wherein the parametric distribution(s) corresponding to positive and negative biometric verification(s) is/are normal distribution(s).

Clause 41. A method according to any of clauses 1 to 40, wherein the one or more captures are presumed to include at least one personal audio.

Clause 42. A method according to any of clauses 1 to 41, wherein the one or more captures are presumed to include one or more time-referenced captures including corresponding hidden or coded time-reference to be compared with the predefined expected time or time constraints.

Clause 43. A method according to clause 42, wherein the predefined time-related criteria are configured to extract at least one of the following time data forming the time-reference: time indicating when corresponding time-referenced capture has been obtained, time elapsed from when corresponding capturing device has been switched on, time elapsed from when an app has been downloaded, time elapsed between any other processes performed by the capturing device or module.

Clause 44. A method according to clause 43, wherein extracting the time elapsed between any other processes performed by the capturing device or module comprises extracting a time elapsed between two different captures performed by the capturing device or module.

Clause 45. A method according to any of clauses 42 to 44, wherein the predefined time constraints include verifying whether a time difference or elapsed time between two of the extracted time-references is below or above a predefined time-difference threshold.

Clause 46. A method according to clause 42 to 45, wherein the predefined time constraints include verifying whether a time difference or elapsed time between two of the extracted time-references satisfies or is within a predefined elapsed time value.

Clause 47. A method according to clause 42 to 46, wherein the predefined time constraints include verifying whether all or part of the extracted time-references and/or elapsed time between time-references follow a predefined sequential pattern/model.

Clause 48. A method according to any of clauses 42 to 47, wherein the predefined time-related criteria are configured to extract further data linked to the time-reference for further validations, said further data including at least one of the following data: user-related data, device-related data, capturing conditions data.

Clause 49. A method according to clause 48, wherein the user-related data comprises at least one of the following data: geographic location, user skills preferably including an indicator of whether the user is left and/or right handed.

Clause 50. A method according to any of clauses 48 or 49, wherein the device-related data comprises at least one of the following data: device model, device identifier, device language, operating system, device software and hardware versions, versions of the tools/programs/parts forming/installed in the device, other features of the device.

Clause 51. A method according to any of clauses 48 to 50, wherein the capturing conditions data comprises at least one of the following data: orientation, height, brightness, volume, pressure on the screen, temperature.

Clause 52. A method according to any of clauses 42 to 51, wherein the predefined time-related criteria are configured to perform data extraction based on steganographic techniques including at least one of the following approaches: Least Significant Bit (LSB) techniques, preferably sequential LSB and/or pseudo-random LSB and/or selection function-based LBS techniques; color palette-based techniques; quantized coefficient-based techniques, preferably steganography in JPEG; matrix embedding, coding matrix and/or wet paper code-based techniques; adaptive steganography techniques, preferably Highly Undetectable SteGO (HUGO) techniques and/or Wavelet Obtained Weights (WOW) techniques; phase coding hiding techniques; echo hiding techniques.

Clause 53. A method according to any of clauses 42 to 52, wherein the predefined time-related criteria are configured to perform data extraction depending on a user of the capturing device, preferably depending on a user ID of said user, and wherein preferably said user corresponds to the person whose identity is to be authenticated.

Clause 54. A method according to any of clauses 42 to 53, wherein the predefined time-related criteria are configured to perform extraction of data that is electronically signed with a private key, and to validate said signature(s) with corresponding public key;

wherein preferably said public key(s) is/are obtained from the capturing device or module.

Clause 55. A method according to any of clauses 42 to 54, wherein the predefined time-related criteria are configured to perform extraction of data that is securely encrypted and to decrypt said data with corresponding public key; wherein preferably said public key is obtained from a server.

Clause 56. A computer program comprising program instructions for causing a computing system to perform a method according to any of clauses 1 to 55 for authenticating an identity of a person.

Clause 57. A computer program according to clause 56, embodied on a storage medium.

Clause 58. A computer program according to clause 56, carried on a carrier signal.

Clause 59. A computing system for authenticating an identity of a person, the computing system comprising a memory and a processor, embodying instructions stored in the memory and executable by the processor, the instructions comprising functionality to execute a method according to any of clauses 1 to 55 for authenticating an identity of a person.

Clause 60. A system for authenticating an identity of a person, the system comprising:
- a capturing module configured to obtain, from one or more capturing devices, one or more captures including one or more image and/or audio captures;
- a spoofing-detection module configured to detect, based on predefined spoofing-detection criteria, one or more spoofing indicators in the one or more captures and whether said one or more spoofing indicators correspond or not to spoofing indicia;
- a liveness-detection module configured to detect, based on predefined liveness-detection criteria, one or more biometric features in the one or more captures and whether said one or more biometric features correspond or not to liveness indicia;
- an identity-biometric module configured to detect, based on predefined identity-biometric criteria, one or more biometric attributes in the one or more captures and whether said one or more biometric attributes correspond or not to a predefined human identity;
- a time-checking module configured to extract, based on predefined time-related criteria, a time-reference hidden or codified in the one or more captures and detecting whether said time-reference corresponds or not to a predefined expected time or time constraints;
- an authentication module configured to authenticate the identity of the person depending on whether spoofing indicators corresponding to spoofing indicia have not been detected, whether biometric features have been detected corresponding to liveness indicia, whether biometric attributes have been detected corresponding to predefined human identity, and whether the time-reference corresponds to predefined expected time or time constraints.

Clause 61. A portable device comprising a computing system according to clause 59 or a system according to clause 60.

Clause 62. A portable device according to clause 61, wherein the one or more portable devices includes a smartphone and/or a laptop and/or a tablet and/or smart-glasses and/or a smart-watch and/or a mini-computer and/or a robot and/or a PCB with corresponding processor and memory.

REFERENCES TO PRIOR ART DISCLOSURES

[Balakrishnan, 2013] Balakrishnan, Guha, Fredo Durand, and John Guttag. "Detecting pulse from head motions in video." Computer Vision and Pattern Recognition (CVPR), 2013 IEEE Conference on. IEEE, 2013.

[Bandyopadhyay, 2010] S. K. Bandyopadhyay, I. K. Maitra. "An Application of Palette Based Steganography". International Journal of Computer Applications. Vol. 6, Issue 4, pp. 24-27, September 2010.

[Bernhardt, 2010] Bernhardt, Daniel. "Emotion inference from human body motion". Diss. University of Cambridge, 2010.

[Boulkenafet, 2018] Z. Boulkenafet, Z. Akhtar, X. Feng, and A. Hadid, "Face Anti-spoofing in Biometric Systems", Signal Processing for Security Technologies, pp. 299-321, 2018.

[Chen, 2011] Y.-L. Chen and C.-T. Hsu, "Detecting Recompression of JPEG Images via Periodicity Analysis of Compression Artifacts for Tampering Detection", IEEE Transactions on Information Forensics and Security, vol. 6, pp. 396-406, June 2011.

[Cheng, 2002] C. C. Cheng, T. S. Chen, L. Z. Chung. "A steganographic method based upon JPEG and quantization table modification", Information Sciences. Issue 141, pp. 123-138, 2012.

[Davison, 2015] Davison, Adrian K., Moi Hoon Yap, and Cliff Lansley. "Micro-facial movement detection using individualised baselines and histogram-based descriptors." Systems, Man, and Cybernetics (SMC), 2015 IEEE International Conference on. IEEE, 2015.

[Fahmy, 2017] Fahmy, Gamal, Mamdouh F. Fahmy, and Omar M. Fahmy. "Micro-movement magnification in video signals using complex wavelet analysis." IET Image Processing 11.11 (2017): 986-993.

[Fridrich, 2005] Fridrich, J., Goljan, M. and Soukal, D. "Efficient wet paper codes". International Workshop on Information Hiding. pp. 204-2018, 2005.

[Fridrich, 2006] Fridrich, J., & Soukal, D. "Matrix embedding for large payloads". IEEE Transactions on Information Forensics and Security, 1(3), 390-395, 2006.

[Jayaram, 2011] Jayaram, P., Ranganatha, H. R. and Anupama H. S. "Information Hiding Using Audio Steganography—A Survey". The International Journal on Multimedia and its Applications (IJMA). Vol 3, Issue 3, pp. 86-96. August 2011

[Kavitha, 2012] Mrs. Kavitha, Kavita Kadam, Ashwini Koshti, Priya Dunghay. "Steganography Using Least Significant Bit Algorithm". International Journal of Engineering Research and Applications (IJERA). Vol 2, Issue 3, pp. 338-341. May-June 2013

[Ker, 2007] Ker, Andrew D. "A weighted stego image detector for sequential LSB replacement." Information Assurance and Security, 2007. IAS 2007. Third International Symposium on. IEEE, 2007.

[Kim, 2007] Y. Kim, Z. Duric and D. Richards. "Modified Matrix Encoding Technique for Minimal Distortion Steganography", International Workshop on Information Hiding (IH). pp. 314-327, 2007.

[Kim, 2014] D.-G. Kim and H.-K. Lee, "Color Laser Printer Identification Using Photographed Halftone Images", in Proceedings of IEEE European Signal Processing Conference (EUSIPCO), 2014.

[Liao, 2015] Liao, X., Chen, G., Li, Q. and Liu, J. "Improved WOW Adaptive Image Steganography Method". International Conference on Algorithms and Architectures for Parallel Processing. pp. 695-702, 2015.

[Mandian, 2015] B. Mandian, A. Novozámský, and S. Saic, "Identification of Aliasing-Based Patterns in Re-Captured LCD Screens", in Proceedings of IEEE International Conference on Image Processing (ICIP), 2015.

[Nguyen, 2016] H.-P. Nguyen, F. Retraint, F. Morain-Nicolier, and A. Delahaies, "Face Spoofing Attack Detection Based on the Behavior of Noises", in Proceedings of Global Signal and Information Processing (GlobalSIP), 2016.

[Phan, 2016] Q.-T. Phan, D.-T. Dang-Nguyen, G. Boato, and F. G. B. De Natale, "Face Spoofing Detection Using LDP-TOP", in Proceedings of IEEE International Conference on Image Processing (ICIP), 2016.

[Qi and Su, 2017] Qi, C. and Su F., "Contrastive-center loss for deep neural networks", in 2017 IEEE International Conference on Image Processing (ICIP), 2017

[Sanguinetti, 2015] Sanguinetti, B., Martin, A., Traverso, G., Lavoie, J. and Zbinden, H. "Perfectly secure steganography: Hiding information in the quantum noise of a photograph". arXiv [1509.07106]. 2015.

[Scarzanella, 2013] M. Visentini-Scarzanella and P. L. Dragotti, "Modelling Radial Distortion Chains for Video Recapture Detection", in Proceedings of International Workshop on Multimedia Signal Processing (MMSP), 2013.

[Tagliasacchi, 2016] M. Tagliasacchi, M. Visentini-Scarzanella, P. L. Dragotti, and S. Tubaro, "Identification of Transform Coding Chains", IEEE Transaction on Image Processing, vol. 25, pp. 1109-1122, March 2016.

[Wu, 2015] H. Wu, X. Kong, and S. Shang, "A Printer Forensics Method Using Halftone Dot Arrangement Model", in Proceedings of China Signal and Information Processing (ChinaSIP), 2015.

[Zach, 2012] F. Zach, C. Riess, and E. Angelopoulou, "Automated Image Forgery Detection through Classification of JPEG Ghosts", in Proceedings of Pattern Recognition Symposium, 2012.

What is claimed is:

1. A method of authenticating an identity of a person, the method comprising:

obtaining, from one or more capturing devices, one or more captures including one or more image or one or more audio captures;

detecting, based on predefined spoofing-detection criteria, one or more spoofing indicators in the one or more captures and whether said one or more spoofing indicators correspond or not to spoofing indicia;

detecting, based on predefined liveness-detection criteria, one or more biometric features in the one or more captures and whether said one or more biometric features correspond or not to liveness indicia;

detecting, based on predefined identity-biometric criteria, one or more biometric attributes in the one or more captures and whether said one or more biometric attributes correspond or not to a predefined human identity;

extracting a time reference steganographically hidden in the one or more captures, the time reference being extracted from the one or more captures based on predefined time-related criteria, the time-reference being formed by time data hidden or codified in the one or more captures and detecting whether said time-reference corresponds or not to a predefined expected time or time constraints;

authenticating the identity of the person depending on whether spoofing indicators corresponding to the spoofing indicia have not been detected, whether biometric features have been detected corresponding to the liveness indicia, whether biometric attributes have been detected corresponding to predefined human identity, and whether the time-reference corresponds to the predefined expected time or time constraints.

2. The method according to claim 1 wherein authenticating the identity of the person includes:

determining a combination of at least some of the spoofing, liveness, identity and time-related indicia, and promoting a success of the authentication if said combination satisfies predefined authentication constraints or otherwise promoting a failure of the authentication; wherein determining the combination of at least some of the spoofing, liveness, identity and time-related indicia comprises attributing a weight to each of the spoofing, liveness, identity and time-related indicia in the combination and imposing restrictions on all or a part of spoofing, liveness, identity and time-related indicia in the combination.

3. The method according to claim 2, wherein determining the combination of at least some of the spoofing, liveness, identity and time-related indicia includes performing a convex combination of corresponding indicia, determining a multiplicative combination of the imposed restrictions, and determining a product of said convex combination and said multiplicative combination.

4. The method according to claim 2, wherein the weights and imposed restrictions of the combination of at least some of the spoofing, liveness, identity and time-related indicia are parameterized through machine learning techniques so as to produce the promotion of the success or the promotion of failure of the authentication.

5. The method according to claim 1, wherein the one or more captures include one or more personal photos of the person taken from a photo identification document or in a selfie photo, or at least one personal video of the person taken from a video identification document or in a selfie video.

6. The method according to claim 5, wherein the predefined spoofing-detection criteria are configured to detect distortions in a photo of the one or more personal photos taken from the photo identification document according to at least one of the following two approaches:

1) Using a classifier trained with features derived from light reflection due to an artificial light source to detect whether light reflection on the photo identification document corresponds to an Original or false photo identification document, wherein features derived from the light reflection include one or more of size, area, dispersion degree, texture;
2) Using a classifier trained with texture features to detect whether textures in the photo identification document correspond to an Original or false photo identification document, wherein said detection of textures includes either consideration or non-consideration of light reflection due to an artificial light source.

7. The method according to claim 5, wherein the predefined spoofing-detection criteria are configured to detect distortions between first and second photo identification documents by analyzing an amount of detected light in the first photo identification document as having been taken without an artificial light source and in the second photo identification document as having been taken with an artificial light source, and comparing the amount of detected light in the first and second photo identification documents to detect non-laminated printings.

8. The method according to claim 5, wherein the predefined spoofing-detection criteria are configured to detect distortions in a personal video included in the at least one personal video according to at least one of the following four approaches:
   1) Detecting optical distortions produced by digital manipulation of the personal video;
   2) Detecting and analyzing print-derived or digital noise in the personal video;
   3) Detecting thermal changes in the personal video;
   4) Estimating scene deepness to form one or more three-dimensional images from one or more two-dimensional images or frames included in the personal video.

9. The method according to claim 8, wherein the detection of thermal changes in the one or more personal videos is performed taking into account technical characteristics of a thermal camera used to capture the one or more personal videos.

10. The method according to claim 9, wherein the detection of thermal changes in the one or more personal videos is performed by a capturing device or module taking into account that the thermal camera is comprised in the capturing device or module or in another device in communication with the capturing device or module with or without a server intermediating between the capturing device or module and said another device.

11. The method according to claim 5, wherein the predefined liveness-detection criteria are configured to detect biometric features and correspondent liveness indicia from one or more personal videos included in the at least one personal video according to at least one of the following three approaches:
   1) Detecting spatial changes or movements perceptible or not at plain view in the one or more personal videos;
   2) Detecting physiological changes in a person represented in the one or more personal videos;
   3) Detecting light changes or color changes in the one or more personal videos.

12. The method according to claim 11, wherein the detection of spatial changes or movements in the one or more personal videos comprises:
   detecting any spatial change related to a human body represented in the one or more personal videos related to a human head of the human body, related to eyes or eyebrows or nose or mouth or lips or cheeks or forehead or hair of the human head; wherein the detection of any spatial change related to a human body represented in the one or more personal videos is performed according to at least one of the following four approaches:
   1) Detecting micro-movements or color micro-changes in the personal video;
   2) Detecting a pulse of the human body by analyzing micro-movements of a head of the human body, or nostrils, or blood vessels of any part of the human body based on an analysis in time or frequency domains;
   3) Detecting hair growth on a human head of the human body, taking into account technical characteristics of an optical lens used to enhance resolution of the one or more personal videos;
   4) Detecting pupil shape changes or blinks in the eyes of the human body represented in the one or more personal videos.

13. The method according to claim 11, wherein the detection of light or color changes in the one or more personal videos is performed according to at least one of the following three approaches:
   1) Taking into account that the one or more personal videos includes one or more lighted personal videos and one or more unlighted personal videos, the one or more lighted personal videos corresponding to personal videos captured with an artificial light source and the one or more unlighted personal videos corresponding to personal videos captured without artificial light source, the lighted and unlighted personal videos being face videos;
   2) Taking into account that the one or more personal videos have been captured by a video capturing device that has performed a programmed action during corresponding video capture, so as to detect plain view changes caused by said programmed action in corresponding person represented in the one or more personal videos;
   3) Taking into account that the one or more personal videos includes capture of a requested human action performed by corresponding person during corresponding video capture of the one or more personal videos, so as to detect plain view changes caused by said requested human action.

14. The method according to claim 13, wherein the detection of light or color changes taking into account the lighted and unlighted personal videos is performed according to at least one of the following eight approaches:
   1) Taking into account that the one or more lighted personal videos have been captured with a varying artificial light source by producing varying illumination or color in a screen of a corresponding capturing device;
   2) Taking into account that the one or more lighted personal videos have been captured with a varying artificial light source by producing a randomly varying color in a screen of a corresponding capturing device, so as to detect reflections of said varying color on a corresponding human face represented in the one or more lighted personal videos;
   3) Taking into account that the one or more lighted personal videos have been captured with a varying artificial light source with different illumination levels or similar;
   4) Taking into account that the one or more lighted personal videos have been captured with different illumination levels or similar randomly varied or following a time variant function;

5) Taking into account that the one or more lighted personal videos have been captured with randomly varied illumination within a same video capture;
6) Taking into account that the one or more lighted personal videos and the one or more unlighted personal videos have been captured with different exposure times with different exposure times randomly varied;
7) Detecting light changes in a pupil of an eye of the person represented in the one or more lighted personal videos and the one or more unlighted personal videos taking into account light intensity changes due to light reflections in the pupil or pupil shape changes between the one or more lighted personal videos and the one or more unlighted personal videos;
8) Detecting light changes in a nose of the person represented in the one or more lighted personal videos and the one or more unlighted personal videos taking into account that the nose corresponds to a most prominent face part causing more intense light reflections.

15. The method according to claim 13, wherein the detection of light or color changes taking into account a requested human action during corresponding video capture is performed according to at least one of the following three approaches:
   1) Detecting in the one or more personal videos an executed human action not defined in the requested human action, the requested human action including pointing to an environment element, touching a screen, providing a fingerprint or the executed human action being detected via comparison with a predefined head movement or a predefined eye movement;
   2) Detecting, in the one or more personal videos, an executed human action indicating features of a visual stimulus included in the requested human action, the executed human action being detected from an audio component of the personal videos and/or by detecting a manual feature selection on a screen from a visual component of the personal videos;
   3) Detecting, in the one or more personal videos, lip movements and spoken words from said lip movements due to a speech indicated in the requested human action, and further detecting the spoken words through speech recognition from an audio component of the personal videos, or detecting a correspondence between the spoken words from the lip movements and the spoken words from the audio component.

16. The method according to claim 1, wherein the one or more captures include at least one personal audio.

17. The method according to claim 1, wherein the time data comprises at least one of:
   1) A time indicating when a corresponding time-referenced capture has been obtained;
   2) A time elapsed from when the one or more capturing devices has been switched on;
   3) A time elapsed from when an app has been downloaded;
   4) A time elapsed between any other processes performed by the one or more capturing devices.

18. A computing system for authenticating an identity of a person, the computing system comprising a memory and a processor, embodying instructions stored in the memory and executable by the processor, the instructions comprising functionality to execute the method according to claim 1 for authenticating an identity of a person.

* * * * *